(12) United States Patent
Mason et al.

(10) Patent No.: US 9,691,383 B2
(45) Date of Patent: *Jun. 27, 2017

(54) MULTI-TIERED VOICE FEEDBACK IN AN ELECTRONIC DEVICE

(71) Applicant: Apple Inc., Cupertino, CA (US)

(72) Inventors: James Eric Mason, Campbell, CA (US); Jesse Boettcher, San Jose, CA (US)

(73) Assignee: Apple Inc., Cupertino, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 14/141,254

(22) Filed: Dec. 26, 2013

(65) Prior Publication Data

US 2014/0108017 A1 Apr. 17, 2014

Related U.S. Application Data

(63) Continuation of application No. 12/205,780, filed on Sep. 5, 2008, now Pat. No. 8,768,702.

(51) Int. Cl.
*G10L 15/00* (2013.01)
*G10L 15/22* (2006.01)
(Continued)

(52) U.S. Cl.
CPC ............ *G10L 15/22* (2013.01); *G06F 3/0482* (2013.01); *G10L 13/00* (2013.01); *H04M 1/72583* (2013.01)

(58) Field of Classification Search
CPC .......... G10L 15/22; G06F 3/167; G06F 9/4443
(Continued)

(56) References Cited

U.S. PATENT DOCUMENTS 3,704,345 A 11/1972 Coker et al.
3,828,132 A 8/1974 Flanagan et al.
(Continued)

FOREIGN PATENT DOCUMENTS

CH 681573 A5 4/1993
CN 1524218 A 8/2004
(Continued)

OTHER PUBLICATIONS

Alfred App, 2011, http://www.alfredapp.com/, 5 pages.
(Continued)

*Primary Examiner* — Daniel Abebe
(74) *Attorney, Agent, or Firm* — Morrison & Foerster LLP

(57) ABSTRACT

This invention is directed to providing voice feedback to a user of an electronic device. Because each electronic device display may include several speakable elements (i.e., elements for which voice feedback is provided), the elements may be ordered. To do so, the electronic device may associate a tier with the display of each speakable element. The electronic device may then provide voice feedback for displayed speakable elements based on the associated tier. To reduce the complexity in designing the voice feedback system, the voice feedback features may be integrated in a Model View Controller (MVC) design used for displaying content to a user. For example, the model and view of the MVC design may include additional variables associated with speakable properties. The electronic device may receive audio files for each speakable element using any suitable approach, including for example by providing a host device with a list of speakable elements and directing a text to speech engine of the host device to generate and provide the audio files.

23 Claims, 9 Drawing Sheets

(51) Int. Cl.
  *G06F 3/0482* (2013.01)
  *G10L 13/00* (2006.01)
  *H04M 1/725* (2006.01)

(58) Field of Classification Search
  USPC .......................................... 704/275; 715/716
  See application file for complete search history.

(56) References Cited

U.S. PATENT DOCUMENTS

| | | |
|---|---|---|
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,614 A | 9/1991 | Bianco |
| 5,057,915 A | 10/1991 | Von Kohorn |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lennig et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,390 A | 3/1998 | Katayanagi et al. |

(56) References Cited

U.S. PATENT DOCUMENTS

| | | |
|---|---|---|
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,233 A | 1/1999 | Poletti |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,873,064 A * | 2/1999 | De Armas .......... G06F 9/45512 704/275 |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Bellegarda et al. |
| 6,401,065 B1 | 6/2002 | Kanevsky et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,489,951 B1 | 12/2002 | Wong et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |

(56) References Cited

U.S. PATENT DOCUMENTS

| | | |
|---|---|---|
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Wang et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Wolf et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,499 B1 | 6/2005 | Sabourin et al. |
| 6,924,828 B1 | 8/2005 | Hirsch |
| 6,928,614 B1 | 8/2005 | Everhart |
| 6,931,384 B1 | 8/2005 | Horvitz et al. |
| 6,937,975 B1 | 8/2005 | Elworthy |
| 6,937,986 B2 | 8/2005 | Denenberg et al. |
| 6,960,734 B1 | 11/2005 | Park |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,020,685 B1 | 3/2006 | Chen et al. |
| 7,027,974 B1 | 4/2006 | Busch et al. |
| 7,036,128 B1 | 4/2006 | Julia et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,152,070 B1 | 12/2006 | Musick et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,260,529 B1 | 8/2007 | Lengen |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,319,957 B2 | 1/2008 | Robinson et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,467,087 B1 | 12/2008 | Gillick et al. |
| 7,475,010 B2 | 1/2009 | Chao |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,558,730 B2 | 7/2009 | Davis et al. |
| 7,571,106 B2 | 8/2009 | Cao et al. |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,715 B2 | 4/2010 | Hwang et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,826,945 B2 | 11/2010 | Zhang et al. |

(56) References Cited

U.S. PATENT DOCUMENTS

| | | | |
|---|---|---|---|
| 7,831,426 B2 | 11/2010 | Bennett | |
| 7,840,400 B2 | 11/2010 | Lavi et al. | |
| 7,840,447 B2 | 11/2010 | Kleinrock et al. | |
| 7,853,574 B2 | 12/2010 | Kraenzel et al. | |
| 7,873,519 B2 | 1/2011 | Bennett | |
| 7,873,654 B2 | 1/2011 | Bernard | |
| 7,881,936 B2 | 2/2011 | Longé et al. | |
| 7,890,652 B2 | 2/2011 | Bull et al. | |
| 7,912,702 B2 | 3/2011 | Bennett | |
| 7,917,367 B2 | 3/2011 | Di Cristo et al. | |
| 7,917,497 B2 | 3/2011 | Harrison et al. | |
| 7,920,678 B2 | 4/2011 | Cooper et al. | |
| 7,925,525 B2 | 4/2011 | Chin | |
| 7,930,168 B2 | 4/2011 | Weng et al. | |
| 7,936,861 B2 * | 5/2011 | Knott | H04M 3/493 379/72 |
| 7,949,529 B2 | 5/2011 | Weider et al. | |
| 7,949,534 B2 | 5/2011 | Davis et al. | |
| 7,974,844 B2 | 7/2011 | Sumita | |
| 7,974,972 B2 | 7/2011 | Cao | |
| 7,983,915 B2 | 7/2011 | Knight et al. | |
| 7,983,917 B2 | 7/2011 | Kennewick et al. | |
| 7,983,997 B2 | 7/2011 | Allen et al. | |
| 7,986,431 B2 | 7/2011 | Emori et al. | |
| 7,987,151 B2 | 7/2011 | Schott et al. | |
| 7,996,228 B2 | 8/2011 | Miller et al. | |
| 8,000,453 B2 | 8/2011 | Cooper et al. | |
| 8,005,679 B2 | 8/2011 | Jordan et al. | |
| 8,015,006 B2 | 9/2011 | Kennewick et al. | |
| 8,024,195 B2 | 9/2011 | Mozer et al. | |
| 8,036,901 B2 | 10/2011 | Mozer | |
| 8,041,570 B2 | 10/2011 | Mirkovic et al. | |
| 8,041,611 B2 | 10/2011 | Kleinrock et al. | |
| 8,055,708 B2 | 11/2011 | Chitsaz et al. | |
| 8,065,155 B1 | 11/2011 | Gazdzinski | |
| 8,065,156 B2 | 11/2011 | Gazdzinski | |
| 8,069,046 B2 | 11/2011 | Kennewick et al. | |
| 8,073,681 B2 | 12/2011 | Baldwin et al. | |
| 8,078,473 B1 | 12/2011 | Gazdzinski | |
| 8,082,153 B2 | 12/2011 | Coffman et al. | |
| 8,095,364 B2 | 1/2012 | Longé et al. | |
| 8,099,289 B2 | 1/2012 | Mozer et al. | |
| 8,107,401 B2 | 1/2012 | John et al. | |
| 8,112,275 B2 | 2/2012 | Kennewick et al. | |
| 8,112,280 B2 | 2/2012 | Lu | |
| 8,117,037 B2 | 2/2012 | Gazdzinski | |
| 8,131,557 B2 | 3/2012 | Davis et al. | |
| 8,140,335 B2 | 3/2012 | Kennewick et al. | |
| 8,165,886 B1 | 4/2012 | Gagnon et al. | |
| 8,166,019 B1 | 4/2012 | Lee et al. | |
| 8,190,359 B2 | 5/2012 | Bourne | |
| 8,195,467 B2 | 6/2012 | Mozer et al. | |
| 8,204,238 B2 | 6/2012 | Mozer | |
| 8,205,788 B1 | 6/2012 | Gazdzinski et al. | |
| 8,219,407 B1 | 7/2012 | Roy et al. | |
| 8,285,551 B2 | 10/2012 | Gazdzinski | |
| 8,285,553 B2 | 10/2012 | Gazdzinski | |
| 8,290,778 B2 | 10/2012 | Gazdzinski | |
| 8,290,781 B2 | 10/2012 | Gazdzinski | |
| 8,296,146 B2 | 10/2012 | Gazdzinski | |
| 8,296,153 B2 | 10/2012 | Gazdzinski | |
| 8,301,456 B2 | 10/2012 | Gazdzinski | |
| 8,311,834 B1 | 11/2012 | Gazdzinski | |
| 8,370,158 B2 | 2/2013 | Gazdzinski | |
| 8,371,503 B2 | 2/2013 | Gazdzinski | |
| 8,374,871 B2 | 2/2013 | Ehsani et al. | |
| 8,381,107 B2 * | 2/2013 | Rottler | G06F 3/167 715/716 |
| 8,447,612 B2 | 5/2013 | Gazdzinski | |
| 8,661,112 B2 * | 2/2014 | Creamer | H04M 3/42059 379/88.16 |
| 2001/0047264 A1 | 11/2001 | Roundtree | |
| 2002/0032564 A1 | 3/2002 | Ehsani et al. | |
| 2002/0046025 A1 | 4/2002 | Hain | |
| 2002/0069063 A1 | 6/2002 | Buchner et al. | |
| 2002/0077817 A1 | 6/2002 | Atal | |
| 2002/0103641 A1 | 8/2002 | Kuo et al. | |
| 2002/0164000 A1 | 11/2002 | Cohen et al. | |
| 2002/0198714 A1 | 12/2002 | Zhou | |
| 2003/0036909 A1 * | 2/2003 | Kato | G03G 15/5016 704/275 |
| 2003/0099335 A1 | 5/2003 | Tanaka et al. | |
| 2003/0157968 A1 | 8/2003 | Boman et al. | |
| 2003/0234824 A1 | 12/2003 | Litwiller | |
| 2004/0135701 A1 | 7/2004 | Yasuda et al. | |
| 2004/0145607 A1 | 7/2004 | Alderson | |
| 2004/0236778 A1 | 11/2004 | Junqua et al. | |
| 2005/0015254 A1 * | 1/2005 | Beaman | G06F 3/167 704/270.1 |
| 2005/0045373 A1 | 3/2005 | Born | |
| 2005/0055403 A1 | 3/2005 | Brittan | |
| 2005/0058438 A1 | 3/2005 | Hayashi | |
| 2005/0071332 A1 | 3/2005 | Ortega et al. | |
| 2005/0080625 A1 | 4/2005 | Bennett et al. | |
| 2005/0091118 A1 | 4/2005 | Fano | |
| 2005/0102614 A1 | 5/2005 | Brockett et al. | |
| 2005/0108001 A1 | 5/2005 | Aarskog | |
| 2005/0114124 A1 | 5/2005 | Liu et al. | |
| 2005/0119897 A1 | 6/2005 | Bennett et al. | |
| 2005/0143972 A1 | 6/2005 | Gopalakrishnan et al. | |
| 2005/0165607 A1 | 7/2005 | DiFabbrizio et al. | |
| 2005/0182629 A1 | 8/2005 | Coorman et al. | |
| 2005/0196733 A1 | 9/2005 | Budra et al. | |
| 2005/0288936 A1 | 12/2005 | Busayapongchai et al. | |
| 2006/0018492 A1 | 1/2006 | Chiu et al. | |
| 2006/0095848 A1 | 5/2006 | Naik | |
| 2006/0106592 A1 | 5/2006 | Brockett et al. | |
| 2006/0106594 A1 | 5/2006 | Brockett et al. | |
| 2006/0106595 A1 | 5/2006 | Brockett et al. | |
| 2006/0117002 A1 | 6/2006 | Swen | |
| 2006/0122834 A1 | 6/2006 | Bennett | |
| 2006/0143007 A1 | 6/2006 | Koh et al. | |
| 2006/0143576 A1 | 6/2006 | Gupta et al. | |
| 2007/0055529 A1 | 3/2007 | Kanevsky et al. | |
| 2007/0058832 A1 | 3/2007 | Hug et al. | |
| 2007/0088556 A1 | 4/2007 | Andrew | |
| 2007/0100790 A1 | 5/2007 | Cheyer et al. | |
| 2007/0106674 A1 | 5/2007 | Agrawal et al. | |
| 2007/0118377 A1 | 5/2007 | Badino et al. | |
| 2007/0135949 A1 | 6/2007 | Snover et al. | |
| 2007/0174188 A1 | 7/2007 | Fish | |
| 2007/0180383 A1 * | 8/2007 | Naik | G06F 9/4443 715/727 |
| 2007/0185917 A1 | 8/2007 | Prahlad et al. | |
| 2007/0192026 A1 * | 8/2007 | Lee | G06F 3/16 701/431 |
| 2007/0211071 A1 | 9/2007 | Slotznick et al. | |
| 2007/0282595 A1 | 12/2007 | Tunning et al. | |
| 2008/0012950 A1 | 1/2008 | Lee et al. | |
| 2008/0015864 A1 | 1/2008 | Ross et al. | |
| 2008/0021708 A1 | 1/2008 | Bennett et al. | |
| 2008/0034032 A1 | 2/2008 | Healey et al. | |
| 2008/0052063 A1 | 2/2008 | Bennett et al. | |
| 2008/0114604 A1 * | 5/2008 | Wei | G06F 3/038 704/275 |
| 2008/0120112 A1 | 5/2008 | Jordan et al. | |
| 2008/0129520 A1 * | 6/2008 | Lee | G06F 3/167 340/636.1 |
| 2008/0140657 A1 | 6/2008 | Azvine et al. | |
| 2008/0189114 A1 | 8/2008 | Fail et al. | |
| 2008/0221903 A1 | 9/2008 | Kanevsky et al. | |
| 2008/0228496 A1 | 9/2008 | Yu et al. | |
| 2008/0247519 A1 | 10/2008 | Abella et al. | |
| 2008/0249770 A1 | 10/2008 | Kim et al. | |
| 2008/0300878 A1 | 12/2008 | Bennett | |
| 2008/0319763 A1 | 12/2008 | Di Fabbrizio et al. | |
| 2009/0006100 A1 | 1/2009 | Badger et al. | |
| 2009/0006343 A1 | 1/2009 | Platt et al. | |
| 2009/0030800 A1 | 1/2009 | Grois | |
| 2009/0055179 A1 | 2/2009 | Cho et al. | |
| 2009/0058823 A1 | 3/2009 | Kocienda | |
| 2009/0076796 A1 | 3/2009 | Daraselia | |
| 2009/0077165 A1 | 3/2009 | Rhodes et al. | |
| 2009/0100049 A1 | 4/2009 | Cao | |

(56) References Cited

U.S. PATENT DOCUMENTS

| | | |
|---|---|---|
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0164655 A1 | 6/2009 | Pettersson et al. |
| 2009/0171664 A1 | 7/2009 | Kennewick et al. |
| 2009/0187950 A1* | 7/2009 | Nicas .................... G10L 13/00 725/56 |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0064218 A1* | 3/2010 | Bull ...................... G06F 3/167 715/716 |
| 2010/0088020 A1 | 4/2010 | Sano et al. |
| 2010/0138215 A1 | 6/2010 | Williams |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0137367 A1 | 5/2012 | Dupont et al. |
| 2012/0173464 A1 | 7/2012 | Tur et al. |
| 2012/0265528 A1 | 10/2012 | Gruber et al. |
| 2012/0271676 A1 | 10/2012 | Aravamudan et al. |
| 2012/0311583 A1 | 12/2012 | Gruber et al. |
| 2013/0110518 A1 | 5/2013 | Gruber et al. |
| 2013/0110520 A1 | 5/2013 | Cheyer et al. |
| 2014/0195251 A1* | 7/2014 | Zeinstra .................. G10L 15/22 704/275 |

FOREIGN PATENT DOCUMENTS

| | | |
|---|---|---|
| CN | 1535519 A | 10/2004 |
| CN | 101179754 A | 5/2008 |
| CN | 101188644 A | 5/2008 |
| CN | 101246020 A | 8/2008 |
| DE | 3837590 A1 | 5/1990 |
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 A1 | 10/2002 |
| EP | 2 109 295 A1 | 10/2009 |
| GB | 2293667 A | 4/1996 |
| JP | 06 019965 | 1/1994 |
| JP | 2001 125896 | 5/2001 |
| JP | 2002 024212 | 1/2002 |
| JP | 2003 517158 A | 5/2003 |
| JP | 2009 036999 | 2/2009 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10 2011 0113414 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 00/60435 | 10/2000 |
| WO | WO 00/60435 A3 | 10/2000 |
| WO | WO 02/073603 A1 | 9/2002 |
| WO | WO 2006/129967 A1 | 12/2006 |
| WO | WO 2008/085742 A2 | 7/2008 |
| WO | WO 2008/109835 A2 | 9/2008 |
| WO | WO 2011/088053 A2 | 7/2011 |

OTHER PUBLICATIONS

Ambite, JL., et al., "Design and Implementation of the CALO Query Manager," Copyright © 2006, American Association for Artificial Intelligence, (www.aaai.org), 8 pages.

Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International

(56) References Cited

OTHER PUBLICATIONS

Conference on Human Language Technology Research, Paper, Copyright © 2001 HRL Laboratories, LLC, http://citeseerx.ist.psu.edu/viewdoc/summary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Bussler, C., et al., "Web Service Execution Environment (WSMX)," Jun. 3, 2005, W3C Member Submission, http://www.w3.org/Submission/WSMX, 29 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

Chen, Y., "Multimedia Siri Finds and Plays Whatever You Ask for," Feb. 9, 2012, http://www.psfk.com/2012/02/multimedia-siri.html, 9 pages.

Cheyer, A., "About Adam Cheyer," Sep. 17, 2012, http://www.adam.cheyer.com/about.html, 2 pages.

Cheyer, A., "A Perspective on AI & Agent Technologies for SCM," VerticalNet, 2001 presentation, 22 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.

Dusan, S., et al., "Multimodal Interaction on PDA's Integrating Speech and Pen Inputs," Eurospeech 2003—Geneva, 4 pages.

Elio, R. et al., "On Abstract Task Models and Conversation Policies," May 1999, http://webdocs.cs.ualberta.ca/~ree/publications/papers2/ATS.AA99.pdf, 10 pages.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/pubications_public/deliverables_public/D1_6.pdf, 127 pages.

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/sumnnary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Glass, J., et al., "Multilingual Spoken-Language Understanding in the MIT Voyager System," Aug. 1995, http://groups.csail.mit.edu/sls/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sept 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.

(56) References Cited

OTHER PUBLICATIONS

Gruber, T. R., et al.,"NIKE: A National Infrastructure for Knowledge Exchange," Oct. 1994, http://www.eit.com/papers/nike/nike.html and nike.ps, 10 pages.
Gruber, T. R., "Ontologies, Web 2.0 and Beyond," Apr. 24, 2007, Ontology Summit 2007, http://tomgruber.org/writing/ontolog-social-web-keynote.pdf, 17 pages.
Gruber, T. R., "Ontology of Folksonomy: A Mash-up of Apples and Oranges," Originally published to the web in 2005, Int'l Journal on Semantic Web & Information Systems, 3(2), 2007, 7 pages.
Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.
Gruber, T. R., "TagOntology," Presentation to Tag Camp, www.tagcamp.org, Oct. 29, 2005, 20 pages.
Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.
Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.
Gruber, T. R., "Where the Social Web meets the Semantic Web," Presentation at the 5th International Semantic Web Conference, Nov. 7, 2006, 38 pages.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.
Guzzoni, D., et al., "Active, A Tool for Building Intelligent User Interfaces," ASC 2007, Palma de Mallorca, http://lsro.epfl.ch/page-34241.html, 6 pages.
Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.
Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.
Intraspect Software, "The Intraspect Knowledge Management Solution: Technical Overview," http://tomgruber.org/writing/intraspect-whitepaper-1998.pdf, 18 pages.
Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
McGuire, J., et al., "SHADE: Technology for Knowledge-Based Collaborative Engineering," 1993, Journal of Concurrent Engineering: Applications and Research (CERA), 18 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions On Speech and Audio Processing, vol. 8, No. 5, Sep. 2000, 14 pages.
Phoenix Solutions, Inc. v. West Interactive Corp., Document 40, Declaration of Christopher Schmandt Regarding the MIT Galaxy System dated Jul. 2, 2010, 162 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, (http://tomgruber.org/writing/ksl-95-69.pdf, Sep. 1995.) CHI '96 Proceedings: Conference on Human Factors in Computing Systems, Apr. 13-18, 1996, Vancouver, BC, Canada, 14 pages.
Rivlin, Z., et al., "Maestro: Conductor of Multimedia Analysis Technologies," 1999 SRI International, Communications of the Association for Computing Machinery (CACM), 7 pages.
Roddy, D., et al., "Communication and Collaboration in a Landscape of B2B eMarketplaces," VerticalNet Solutions, white paper, Jun. 15, 2000, 23 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http:// www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.

(56) References Cited

OTHER PUBLICATIONS

Tofel, K., et al., "SpeakTolt: A personal assistant for older iPhones, iPads," Feb. 9, 2012, http://gigaom.com/apple/speaktoit-siri-for-older-iphones-ipads/, 7 pages.

Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.

Tur, G., et al., "The-CALO-Meeting-Assistant System," IEEE Transactions on Audio, Speech, and Language Processing, vol. 18, No. 6, Aug. 2010, 11 pages.

Tur, G., et al., "The CALO Meeting Speech Recognition and Understanding System," 2008, Proc. IEEE Spoken Language Technology Workshop, 4 pages.

Vlingo, "Vlingo Launches Voice Enablement Application on Apple App Store," Vlingo press release dated Dec. 3, 2008, 2 pages.

Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.

YouTube, "Knowledge Navigator," 5:34 minute video uploaded to YouTube by Knownav on Apr. 29, 2008, http://www.youtube.com/watch?v=QRH8eimU_20, 1 page.

YouTube, "Send Text, Listen to and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.

YouTube, "Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.

YouTube, "Voice On The Go (BlackBerry)," 2:51 minute video uploaded to YouTube by VoiceOnTheGo on Jul. 27, 2009, http://www.youtube.com/watch?v=pJqpWgQS98w, 1 page.

Zue, V., "Conversational Interfaces: Advances and Challenges," Sep. 1997, http://www.cs.cmu.edu/~dod/papers/zue97.pdf, 10 pages.

Zue, V. W., "Toward Systems that Understand Spoken Language," Feb. 1994, ARPA Strategic Computing Institute, © 1994 IEEE, 9 pages.

International Search Report and Written Opinion dated Nov. 29, 2011, received in International Application No. PCT/US2011/20861, which corresponds to U.S. Appl. No. 12/987,982, 15 pages (Thomas Robert Gruber).

Acero, A., et al., "Environmental Robustness in Automatic Speech Recognition," International Conference on Acoustics, Speech, and Signal Processing (ICASSP'90), Apr. 3-6, 1990, 4 pages.

Acero, A., et al., "Robust Speech Recognition by Normalization of The Acoustic Space," International Conference on Acoustics, Speech, and Signal Processing, 1991, 4 pages.

Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.

Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.

Anastasakos, A., et al., "Duration Modeling in Large Vocabulary Speech Recognition," International Conference on Acoustics, Speech, and Signal Processing (ICASSP'95), May 9-12, 1995, 4 pages.

Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.

Ansari, R., et al., "Pitch Modification of Speech using a Low-Sensitivity Inverse Filter Approach," IEEE Signal Processing Letters, vol. 5, No. 3, Mar. 1998, 3 pages.

Anthony, N. J., et al., "Supervised Adaption for Signature Verification System," Jun. 1, 1978, IBM Technical Disclosure, 3 pages.

Apple Computer, "Guide Maker User's Guide," © Apple Computer, Inc., Apr. 27, 1994, 8 pages.

Apple Computer, "Introduction to Apple Guide," © Apple Computer, Inc., Apr. 28, 1994, 20 pages.

Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.

Atal, B. S., "Efficient Coding of LPC Parameters by Temporal Decomposition," IEEE International Conference on Acoustics, Speech, and Signal Processing (ICASSP'83), Apr. 1983, 4 pages.

Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.

Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.

Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.

Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.

Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.

Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.

Banbrook, M., "Nonlinear Analysis of Speech from a Synthesis Perspective," A thesis submitted for the degree of Doctor of Philosophy, The University of Edinburgh, Oct. 15, 1996, 35 pages.

Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.

Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris-France, Jul. 1993, 11 pages.

Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.

Bellegarda, J. R., "A Multispan Language Modeling Framework for Large Vocabulary Speech Recognition," IEEE Transactions on Speech and Audio Processing, vol. 6, No. 5, Sep. 1998, 12 pages.

Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.

Bellegarda, J. R., et al., "Experiments Using Data Augmentation for Speaker Adaptation," International Conference on Acoustics, Speech, and Signal Processing (ICASSP'95), May 9-12, 1995, 4 pages.

Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.

Bellegarda, J. R., "Exploiting Latent Semantic Information in Statistical Language Modeling," In Proceedings of the IEEE, Aug. 2000, vol. 88, No. 8, 18 pages.

Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.

(56) References Cited

OTHER PUBLICATIONS

Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., ED, Directions and Challenges,15th Annual Technical Symposium, Jun. 17, 1976, Gaithersbury, Maryland, 7 pages.
Bulyko, I. et al., "Error-Correction Detection and Response Generation in a Spoken Dialogue System," © 2004 Elsevier B.V., specom.2004.09.009, 18 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of A Personalized Information Grazing Service," INFOCOM'90, Ninth Annual Joint Conference of the IEEE Computer and Communication Societies, Jun. 3-7, 1990, http://slrohall.com/publications/, 8 pages.
Buzo, A., et al., "Speech Coding Based Upon Vector Quantization," IEEE Transactions on Acoustics, Speech, and Signal Processing, vol. Assp-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," Computer Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Cox, R. V., et al., "Speech and Language Processing for Next-Millennium Communications Services," Proceedings of the IEEE, vol. 88, No. 8, Aug. 2000, 24 pages.
Davis, Z., et al., "A Personal Handheld Multi-Modal Shopping Assistant," 2006 IEEE, 9 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.

Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://www.dspguru.com/dsp/taqs/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.

(56) References Cited

OTHER PUBLICATIONS

Kubala, F., et al., "Speaker Adaptation from a Speaker-Independent Training Corpus," International Conference on Acoustics, Speech, and Signal Processing (ICASSP'90), Apr. 3-6, 1990, 4 pages.

Kubala, F., et al., "The Hub and Spoke Paradigm for CSR Evaluation," Proceedings of the Spoken Language Technology Workshop, Mar. 6-8, 1994, 9 pages.

Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.

Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.

Lee, L, et al., "Golden Mandarin(II)—An Improved Single-Chip Real-Time Mandarin Dictation Machine for Chinese Language with Very Large Vocabulary," 0-7803-0946-4/93 © 1993 IEEE, 4 pages.

Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.

Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.

Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.

Linde, Y., et al., "An Algorithm for Vector Quantizer Design," IEEE Transactions on Communications, vol. 28, No. 1, Jan. 1980, 12 pages.

Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.

Logan, B., "Mel Frequency Cepstral Coefficients for Music Modeling," In International Symposium on Music Information Retrieval, 2000, 2 pages.

Lowerre, B. T., "The-HARPY Speech Recognition System," Doctoral Dissertation, Department of Computer Science, Carnegie Mellon University, Apr. 1976, 20 pages.

Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.

Morgan, B., "Business Objects," (Business Objects for Windows) Business Objects Inc., DBMS Sep. 1992, vol. 5, No. 10, 3 pages.

Mountford, S. J., et al., "Talking and Listening to Computers," The Art of Human-Computer Interface Design, Copyright © 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

Murveit H. et al., "Integrating Natural Language Constraints into HMM-based Speech Recognition," 1990 International Conference on Acoustics, Speech, and Signal Processing, Apr. 3-6, 1990, 5 pages.

Nakagawa, S., et al., "Speaker Recognition by Combining MFCC and Phase Information," IEEE International Conference on Acoustics Speech and Signal Processing (ICASSP), Mar. 14-19, 2010, 4 pages.

Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.

Papadimitriou, C. H., et al., "Latent Semantic Indexing: A Probabilistic Analysis," Nov. 14, 1997, http://citeseerx.ist.psu.edu/messages/downloadsexceeded.html, 21 pages.

Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.

Parsons, T. W., "Voice and Speech Processing," Pitch and Formant Estimation, © 1987 McGraw-Hill, Inc., ISBN: 0-07-0485541-0, 15 pages.

Picone, J., "Continuous Speech Recognition Using Hidden Markov Models," IEEE ASSP Magazine, vol. 7, No. 3, Jul. 1990, 16 pages.

Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.

Ratcliffe, M., "ClearAccess 2.0 allows SQL searches off-line," (Structured Query Language), ClearAcess Corp., MacWeek Nov. 16, 1992, vol. 6, No. 41, 2 pages.

Remde, J. R., et al., "SuperBook: An Automatic Tool for Information Exploration-Hypertext?," In Proceedings of Hypertext'87 papers, Nov. 13-15, 1987, 14 pages.

Reynolds, C. F., "On-Line Reviews: A New Application of the HICOM Conferencing System," IEE Colloquium on Human Factors in Electronic Mail and Conferencing Systems, Feb. 3, 1989, 4 pages.

Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.

Riley, M. D., "Tree-Based Modelling of Segmental Durations," Talking Machines Theories, Models, and Designs, 1992 © Elsevier Science Publishers B.V., North-Holland, ISBN: 08-44489115.3, 15 pages.

Rivoira, S., et al., "Syntax and Semantics in a Word-Sequence Recognition System," IEEE International Conference on Acoustics, Speech, and Signal Processing (ICASSP'79), Apr. 1979, 5 pages.

Rosenfeld, R., "A Maximum Entropy Approach to Adaptive Statistical Language Modelling," Computer Speech and Language, vol. 10, No. 3, Jul. 1996, 25 pages.

Roszkiewicz, A., "Extending your Apple," Back Talk—Lip Service, A+ Magazine, The Independent Guide for Apple Computing, vol. 2, No. 2, Feb. 1984, 5 pages.

Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.

Salton, G., et al., "On the Application of Syntactic Methodologies in Automatic Text Analysis," Information Processing and Management, vol. 26, No. 1, Great Britain 1990, 22 pages.

Savoy, J., "Searching Information in Hypertext Systems Using Multiple Sources of Evidence," International Journal of Man-Machine Studies, vol. 38, No. 6, Jun. 1993, 15 pages.

Scagliola, C., "Language Models and Search Algorithms for Real-Time Speech Recognition," International Journal of Man-Machine Studies, vol. 22, No. 5, 1985, 25 pages.

Schmandt, C., et al., "Augmenting a Window System with Speech Input," IEEE Computer Society, Computer Aug. 1990, vol. 23, No. 8, 8 pages.

Schütze, H., "Dimensions of Meaning," Proceedings of Supercomputing'92 Conference, Nov. 16-20, 1992, 10 pages.

Sheth B., et al., "Evolving Agents for Personalized Information Filtering," In Proceedings of the Ninth Conference on Artificial Intelligence for Applications, Mar. 1-5, 1993, 9 pages.

Shikano, K., et al., "Speaker Adaptation Through Vector Quantization," IEEE International Conference on Acoustics, Speech, and Signal Processing (ICASSP'86), vol. 11, Apr. 1986, 4 pages.

(56) References Cited

OTHER PUBLICATIONS

Sigurdsson, S., et al., "Mel Frequency Cepstral Coefficients: An Evaluation of Robustness of MP3 Encoded Music," in Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.
SRI2009, "SRI Speech: Products: Software Development Kits: EduSpeak," 2009, 2 pages, available at http://web.archive.org/web/20090828084033/http://www.speechatsri.com/products/eduspeak.shtml.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
Van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "MATLAB Lecture 8. Special Matrices in MATLAB," Nov. 23, 2005, UIC Dept. Of Math., Stat.. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, last modified page date: Oct. 13, 2009, http://en.wikipedia.org/wiki/Mel_scale, 2 pages.
Wikipedia, "Minimum Phase," Wikipedia, the free encyclopedia, last modified page date: Jan. 12, 2010, http://en.wikipedia.org/wiki/Minimum_phase, 8 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 5th ISCA Speech Synthesis Workshop—Pittsburgh, Jun. 14-16, 2004, 2 pages.
International Search Report dated Nov. 9, 1994, received in International Application No. PCT/US1993/12666, which corresponds to U.S. Appl. No. 07/999,302, 8 pages (Robert Don Strong).
International Preliminary Examination Report dated Mar. 1, 1995, received in International Application No. PCT/US1993/12666, which corresponds to U.S. Appl. No. 07/999,302, 5 pages (Robert Don Strong).
International Preliminary Examination Report dated Apr. 10, 1995, received in International Application No. PCT/US1993/12637, which corresponds to U.S. Appl. No. 07/999,354, 7 pages (Alejandro Acero).
International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).
Agnäs, MS., et al., "Spoken Language Translator: First-Year Report," Jan. 1994, SICS (ISSN 0283-3638), SRI and Telia Research AB, 161 pages.
Allen, J., "Natural Language Understanding," 2nd Edition, Copyright © 1995 by The Benjamin/Cummings Publishing Company, Inc., 671 pages.
Alshawi, H., et al., "CLARE: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms In The Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z 1992.
Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.
Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to Improve Document Retrieval," 1998, SRI International, Menlo Park, California, 11 pages.

(56) References Cited

OTHER PUBLICATIONS

Berry, P., et al., "Task Management under Change and Uncertainty Constraint Solving Experience with the CALO Project," 2005, Proceedings of CP'05 Workshop on Constraint Solving under Change, 5 pages.

Bobrow, R. et al., "Knowledge Representation for Syntactic/Semantic Processing," From: AAA-80 Proceedings. Copyright © 1980, AAAI, 8 pages.

Bouchou, B., et al., "Using Transducers in Natural Language Database Query," Jun. 17-19, 1999, Proceedings of 4th International Conference on Applications of Natural Language to Information Systems, Austria, 17 pages.

Bratt, H., et al., "The SRI Telephone-based ATIS System," 1995, Proceedings of ARPA Workshop on Spoken Language Technology, 3 pages.

Burke, R., et al., "Question Answering from Frequently Asked Question Files," 1997, AI Magazine, vol. 18, No. 2, 10 pages.

Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.

Carter, D., "Lexical Acquisition in the Core Language Engine," 1989, Proceedings of the Fourth Conference of the European Chapter of the Association for Computational Linguistics, 8 pages.

Carter, D., et al., "The Speech-Language Interface in the Spoken Language Translator," Nov. 23, 1994, SRI International, 9 pages.

Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.

Cheyer, A., et al., "Multimodal Maps: An Agent-based Approach," International Conference on Cooperative Multimodal Communication, 1995, 15 pages.

Cheyer, A., et al., "The Open Agent Architecture," Autonomous Agents and Multi-Agent systems, vol. 4, Mar. 1, 2001, 6 pages.

Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.

Codd, E. F., "Databases: Improving Usability and Responsiveness—'How About Recently'," Copyright © 1978, by Academic Press, Inc., 28 pages.

Cohen, P.R., et al., "An Open Agent Architecture," 1994, 8 pages. http://citeseerx.ist.psu.edu/viewdoc/summary?doi=10.1.1.30.480.

Coles, L. S., et al., "Chemistry Question-Answering," Jun. 1969, SRI International, 15 pages.

Coles, L. S., "Techniques for Information Retrieval Using an Inferential Question-Answering System with Natural-Language Input," Nov. 1972, SRI International, 198 pages.

Coles, L. S., "The Application of Theorem Proving to Information Retrieval," Jan. 1971, SRI International, 21 pages.

Constantinides, P., et al., "A Schema Based Approach to Dialog Control," 1998, Proceedings of the International Conference on Spoken Language Processing, 4 pages.

Craig, J., et al., "Deacon: Direct English Access and Control," Nov. 7-10, 1966 AFIPS Conference Proceedings, vol. 19, San Francisco, 18 pages.

Dar, S., et al., "DTL's DataSpot: Database Exploration Using Plain Language," 1998 Proceedings of the 24th VLDB Conference, New York, 5 pages.

Decker, K., et al., "Designing Behaviors for Information Agents," The Robotics Institute, Carnegie-Mellon University, paper, Jul. 6, 1996, 15 pages.

Decker, K., et al., "Matchmaking and Brokering," The Robotics Institute, Carnegie-Mellon University, paper, May 16, 1996, 19 pages.

Dowding, J., et al., "Gemini: A Natural Language System for Spoken-Language Understanding," 1993, Proceedings of the Thirty-First Annual Meeting of the Association for Computational Linguistics, 8 pages.

Dowding, J., et al., "Interleaving Syntax and Semantics in An Efficient Bottom-Up Parser," 1994, Proceedings of the 32nd Annual Meeting of the Association for Computational Linguistics, 7 pages.

Epstein, M., et al., "Natural Language Access to a Melanoma Data Base," Sep. 1978, SRI International, 7 pages.

Exhibit 1, "Natural Language Interface Using Constrained Intermediate Dictionary of Results," Classes/Subclasses Manually Reviewed for the Search of U.S. Pat. No. 7,177,798, Mar. 22, 2013, 1 page.

Exhibit 1, "Natural Language Interface Using Constrained Intermediate Dictionary of Results," List of Publications Manually reviewed for the Search of U.S. Pat. No. 7,177,798, Mar. 22, 2013, 1 page.

Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.

Fikes, R., et al., "A Network-based knowledge Representation and its Natural Deduction System," Jul. 1977, SRI International, 43 pages.

Garnbäck, B., et al., "The Swedish Core Language Engine," 1992 NOTEX Conference, 17 pages.

Glass, J., et al., "Multilingual Language Generation Across Multiple Domains," Sep. 18-22, 1994, International Conference on Spoken Language Processing, Japan, 5 pages.

Green, C. "The Application of Theorem Proving to Question-Answering Systems," Jun. 1969, SRI Stanford Research Institute, Artificial Intelligence Group, 169 pages.

Gregg, D. G., "DSS Access on the WWW: An Intelligent Agent Prototype," 1998 Proceedings of the Americas Conference on Information Systems-Association for Information Systems, 3 pages.

Grishman, R., "Computational Linguistics: An Introduction," © Cambridge University Press 1986, 172 pages.

Grosz, B. et al., "Dialogic: A Core Natural-Language Processing System," Nov. 9, 1982, SRI International, 17 pages.

Grosz, B. et al., "Research on Natural-Language Processing at SRI," Nov. 1981, SRI International, 21 pages.

Grosz, B., et al., "Team: An Experiment in the Design of Transportable Natural-Language Interfaces," Artificial Intelligence, vol. 32, 1987, 71 pages.

Grosz, B., "Team: A Transportable Natural-Language Interface System," 1983, Proceedings of the First Conference on Applied Natural Language Processing, 7 pages.

Guida, G., et al., "NLI: A Robust Interface for Natural Language Person-Machine Communication," Int. J. Man-Machine Studies, vol. 17, 1982, 17 pages.

Guzzoni, D., et al., "Active, A platform for Building Intelligent Software," Computational Intelligence 2006, 5 pages. http://www.informatik.uni-trier.de/~ley/pers/hd/g/Guzzoni:Didier.

Guzzoni, D., "Active: A unified platform for building intelligent assistant applications," Oct. 25, 2007, 262 pages.

Guzzoni, D., et al., "Many Robots Make Short Work," 1996 AAAI Robot Contest, SRI International, 9 pages.

Haas, N., et al., "An Approach to Acquiring and Applying Knowledge," Nov. 1980, SRI International, 22 pages.

Hadidi, R., et al., "Students' Acceptance of Web-Based Course Offerings: An Empirical Assessment," 1998 Proceedings of the Americas Conference on Information Systems (AMCIS), 4 pages.

Hawkins, J., et al., "Hierarchical Temporal Memory: Concepts, Theory, and Terminology," Mar. 27, 2007, Numenta, Inc., 20 pages.

He, Q., et al., "Personal Security Agent: KQML-Based PKI," The Robotics Institute, Carnegie-Mellon University, paper, Oct. 1, 1997, 14 pages.

Hendrix, G. et al., "Developing a Natural Language Interface to Complex Data," ACM Transactions on Database Systems, vol. 3, No. 2, Jun. 1978, 43 pages.

Hendrix, G., "Human Engineering for Applied Natural Language Processing," Feb. 1977, SRI International, 27 pages.

(56) References Cited

OTHER PUBLICATIONS

Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.
Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992, Computer, Speech and Language, 14 pages.
Issar, S., et al., "CMU's Robust Spoken Language Understanding System," 1993, Proceedings of Eurospeech, 4 pages.
Issar, S., "Estimation of Language Models for New Spoken Language Applications," Oct. 3-6, 1996, Proceedings of 4th International Conference on Spoken language Processing, Philadelphia, 4 pages.
Janas, J., "The Semantics-Based Natural Language Interface to Relational Databases," © Springer-Verlag Berlin Heidelberg 1986, Germany, 48 pages.
Johnson, J., "A Data Management Strategy for Transportable Natural Language Interfaces," Jun. 1989, doctoral thesis submitted to the Department of Computer Science, University of British Columbia, Canada, 285 pages.
Julia, L., et al., "http://www.speech.sri.com/demos/atis.html," 1997, Proceedings of AAAI, Spring Symposium, 5 pages.
Kahn, M., et al., "CoABS Grid Scalability Experiments," 2003, Autonomous Agents and Multi-Agent Systems, vol. 7, 8 pages.
Kamel, M., et al., "A Graph Based Knowledge Retrieval System," © 1990 IEEE, 7 pages.
Katz, B., "Annotating the World Wide Web Using Natural Language," 1997, Proceedings of the 5th RIAO Conference on Computer Assisted Information Searching on the Internet, 7 pages.
Katz, B., "A Three-Step Procedure for Language Generation," Dec. 1980, Massachusetts Institute of Technology, Artificial Intelligence Laboratory, 42 pages.
Kats, B., et al., "Exploiting Lexical Regularities in Designing Natural Language Systems," 1988, Proceedings of the 12th International Conference on Computational Linguistics, Coling'88, Budapest, Hungary, 22 pages.
Katz, B., et al., "REXTOR: A System for Generating Relations from Natural Language," In Proceedings of the ACL Oct. 2000 Workshop on Natural Language Processing and Information Retrieval (NLP &IR), 11 pages.
Katz, B., "Using English for Indexing and Retrieving," 1988 Proceedings of the 1st RIAO Conference on User-Oriented Content-Based Text and Image (RIAO'88), 19 pages.
Konolige, K., "A Framework for a Portable Natural-Language Interface to Large Data Bases," Oct. 12, 1979, SRI International, Artificial Intelligence Center, 54 pages.

Laird, J., et al., "SOAR: An Architecture for General Intelligence," 1987, Artificial Intelligence vol. 33, 64 pages.
Langly, P., et al.,"A Design for the Icarus Architechture," Jan. 1991, SIGART Bulletin, vol. 2, No. 4, 6 pages.
Larks, "Intelligent Software Agents: Larks," 2006, downloaded on Mar. 15, 2013 from http://www.cs.cmu.edu/larks.html, 2 pages.
Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.
Martin, D., et al., "Development Tools for the Open Agent Architecture," Apr. 1996, Proceedings of the International Conference on the Practical Application of Intelligent Agents and Multi-Agent Technology, 17 pages.
Martin, D., et al., "Information Brokering in an Agent Architecture," Apr. 1997, Proceedings of the second International Conference on the Practical Application of Intelligent Agents and Multi-Agent Technology, 20 pages.
Martin, D., et al., "PAAM '98 Tutorial: Building and Using Practical Agent Applications," 1998, SRI International, 78 pages.
Martin, P., et al., "Transportability and Generality in a Natural-Language Interface System," Aug. 8-12, 1983, Proceedings of the Eight International Joint Conference on Artificial Intelligence, West Germany, 21 pages.
Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.
Michos, S.E., et al., "Towards an adaptive natural language interface to command languages," Natural Language Engineering 2 (3), © 1994 Cambridge University Press, 19 pages.
Milstead, J., et al., "Metadata: Cataloging by Any Other Name . . ." Jan. 1999, Online, Copyright © 1999 Information Today, Inc., 18 pages.
Minker, W., et al., "Hidden Understanding Models for Machine Translation," 1999, Proceedings of ETRW on Interactive Dialogue in Multi-Modal Systems, 4 pages.
Modi, P. J., et al., "CMRadar: A Personal Assistant Agent for Calendar Management," © 2004, American Association for Artificial Intelligence, Intelligent Systems Demonstrations, 2 pages.
Moore, R., et al., "Combining Linguistic and Statistical Knowledge Sources in Natural-Language Processing for ATIS," 1995, SRI International, Artificial Intelligence Center, 4 pages.
Moore, R., "Handling Complex Queries in a Distributed Data Base," Oct. 8, 1979, SRI International, Artificial Intelligence Center, 38 pages.
Moore, R., "Practical Natural-Language Processing by Computer," Oct. 1981, SRI International, Artificial Intelligence Center, 34 pages.
Moore, R., et al., "SRI's Experience with the ATIS Evaluation," Jun. 24-27, 1990, Proceedings of a workshop held at Hidden Valley, Pennsylvania, 4 pages.
Moore, et al., "The Information Warefare Advisor: An Architecture for Interacting with Intelligent Agents Across the Web," Dec. 31, 1998 Proceedings of Americas Conference on Information Systems (AMCIS), 4 pages.
Moore, R., "The Role of Logic in Knowledge Representation and Commonsense Reasoning," Jun. 1982, SRI International, Artificial Intelligence Center, 19 pages.
Moore, R., "Using Natural-Language Knowledge Sources in Speech Recognition," Jan. 1999, SRI International, Artificial Intelligence Center, 24 pages.
Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.
Moran, D., "Quantifier Scoping in the SRI Core Language Engine," 1988, Proceedings of the 26th annual meeting on Association for Computational Linguistics, 8 pages.
Motro, A., "Flex: A Tolerant and Cooperative User Interface to Databases," IEEE Transactions on Knowledge and Data Engineering, vol. 2, No. 2, Jun. 1990, 16 pages.

(56) References Cited

OTHER PUBLICATIONS

Murveit, H., et al., "Speech Recognition in SRI's Resource Management and ATIS Systems," 1991, Proceedings of the workshop on Speech and Natural Language (HTL'91), 7 pages.
Oaa, "The Open Agent Architecture 1.0 Distribution Source Code," Copyright 1999, SRI International, 2 pages.
Odubiyi, J., et al., "SAIRE—A scalable agent-based information retrieval engine," 1997 Proceedings of the First International Conference on Autonomous Agents, 12 pages.
Owei, V., et al., "Natural Language Query Filtration in the Conceptual Query Language," © 1997 IEEE, 11 pages.
Pannu, A., et al., "A Learning Personal Agent for Text Filtering and Notification," 1996, The Robotics Institute School of Computer Science, Carnegie-Mellon University, 12 pages.
Pereira, "Logic for Natural Language Analysis," Jan. 1983, SRI International, Artificial Intelligence Center, 194 pages.
Perrault, C.R., et al., "Natural-Language Interfaces," Aug. 22, 1986, SRI International, 48 pages.
Pulman, S.G., et al., "Clare: A Combined Language and Reasoning Engine," 1993, Proceedings of JFIT Conference, 8 pages. URL: http://www.cam.sri.com/tr/crc042/paper.ps.Z.
Ravishankar, "Efficient Algorithms for Speech Recognition," May 15, 1996, Doctoral Thesis submitted to School of Computer Science, Computer Science Division, Carnegie Mellon University, Pittsburg, 146 pages.
Rayner, M., "Abductive Equivalential Translation and its application to Natural Language Database Interfacing," Sep. 1993 Dissertation paper, SRI International, 163 pages.
Rayner, M., et al., "Adapting the Core Language Engine to French and Spanish," May 10, 1996, Cornell University Library, 9 pages. http://arxiv.org/abs/cmp-Ig/9605015.
Rayner, M., et al., "Deriving Database Queries from Logical Forms by Abductive Definition Expansion," 1992, Proceedings of the Third Conference on Applied Natural Language Processing, ANLC'92, 8 pages.
Rayner, M., "Linguistic Domain Theories: Natural-Language Database Interfacing from First Principles," 1993, SRI International, Cambridge, 11 pages.
Rayner, M., et al., "Spoken Language Translation With Mid-90's Technology: A Case Study," 1993, Eurospeech, ISCA, 4 pages. http://dblp.uni-trier.de/db/conf/interspeech/eurospeech1993.html#RaynerBCCDGKKLPPS93.
Roddy, D., et al., "Communication and Collaboration in a Landscape of B2B eMarketplaces," VerticalNet Solutions, white paper, Jun. 15, 2000, 24 pages.
Rudnicky, A.I., et al., "Creating Natural Dialogs in the Carnegie Mellon Communicator System," Jan. 1999, 5 pages.
Russell, S., et al., "Artificial Intelligence, A Modern Approach," © 1995 Prentice Hall, Inc., 121 pages.
Sacerdoti, E., et al., "A Ladder User's Guide (Revised)," Mar. 1980, SRI International, Artificial Intelligence Center, 39 pages.
Sagalowicz, D., "A D-Ladder User's Guide," Sep. 1980, SRI International, 42 pages.
Sameshima, Y., et al., "Authorization with security attributes and privilege delegation Access control beyond the ACL," Computer Communications, vol. 20, 1997, 9 pages.
San-Segundo, R., et al., "Confidence Measures for Dialogue Management in the CU Communicator System," Jun. 5-9, 2000, Proceedings of Acoustics, Speech, and Signal Processing (ICASSP'00), 4 pages.
Sato, H., "A Data Model, Knowledge Base, and Natural Language Processing for Sharing a Large Statistical Database," 1989, Statistical and Scientific Database Management, Lecture Notes in Computer Science, vol. 339, 20 pages.
Schnelle, D., "Context Aware Voice User Interfaces for Workflow Support," Aug. 27, 2007, Dissertation paper, 254 pages.
Sharoff, S., et al., "Register-domain Separation as a Methodology for Development of Natural Language Interfaces to Databases," 1999, Proceedings of Human-Computer Interaction (INTERACT'99), 7 pages.
Shimazu, H., et al., "CAPIT: Natural Language Interface Design Tool with Keyword Analyzer and Case-Based Parser," NEC Research & Development, vol. 33, No. 4, Oct. 1992, 11 pages.
Shinkle, L., "Team User's Guide," Nov. 1984, SRI International, Artificial Intelligence Center, 78 pages.
Shklar, L., et al., "Info Harness: Use of Automatically Generated Metadata for Search and Retrieval of Heterogeneous Information," 1995 Proceedings of CAiSE'95, Finland.
Singh, N., "Unifying Heterogeneous Information Models," 1998 Communications of the ACM, 13 pages.
SR12009, "SRI Speech: Products: Software Development Kits: EduSpeak," 2009, 2 pages, available at http://web.archive.org/web/20090828084033/http://www.speechatsri.com/products/eduspeak.shtml.
Starr, B., et al., "Knowledge-Intensive Query Processing," May 31, 1998, Proceedings of the 5th KRDB Workshop, Seattle, 6 pages.
Stern, R., et al. "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments ," 1999, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the TACITUS Natural Language System," May 1990, SRI International, Artificial Intelligence Center, 16 pages.
Wahlster, W., et al., "Smartkom: multimodal communication with a life-like character," 2001 Eurospeech-Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," Carnegie Mellon University, Jun. 1990, 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.

(56) References Cited

OTHER PUBLICATIONS

Zeng, D., et al., "Cooperative Intelligent Software Agents," The Robotics Institute, Carnegie-Mellon University, Mar. 1995, 13 pages.

Zhao, L., "Intelligent Agents for Flexible Workflow Systems," Oct. 31, 1998 Proceedings of the Americas Conference on Information Systems (AMCIS), 4 pages.

Zue, V., et al., "From Interface to Content: Translingual Access and Delivery of On-Line Information," 1997, Eurospeech, 4 pages.

Zue, V., et al., "Jupiter: A Telephone-Based Conversational Interface for Weather Information," Jan. 2000, IEEE Transactions on Speech and Audio Processing, 13 pages.

Zue, V., et al., "Pegasus: A Spoken Dialogue Interface for On-Line Air Travel Planning," 1994 Elsevier, Speech Communication 15 (1994), 10 pages.

Zue, V., et al., "The Voyager Speech Understanding System: Preliminary Development and Evaluation," 1990, Proceedings of IEEE 1990 International Conference on Acoustics, Speech, and Signal Processing, 4 pages.

Extended European Search Report (includes Partial European Search Report and European Search Opinion) received for European Patent Application No. 16150079.8, mailed on Feb. 18, 2016, 7 pages.

International Preliminary Report on Patentability received for PCT Patent Application No. PCT/US2009/055577, completed on Aug. 6, 2010, 12 pages.

International Search Report and Written Opinion received for PCT Patent Application No. PCT/US2009/055577, mailed on Jan. 26, 2010, 9 pages.

\* cited by examiner

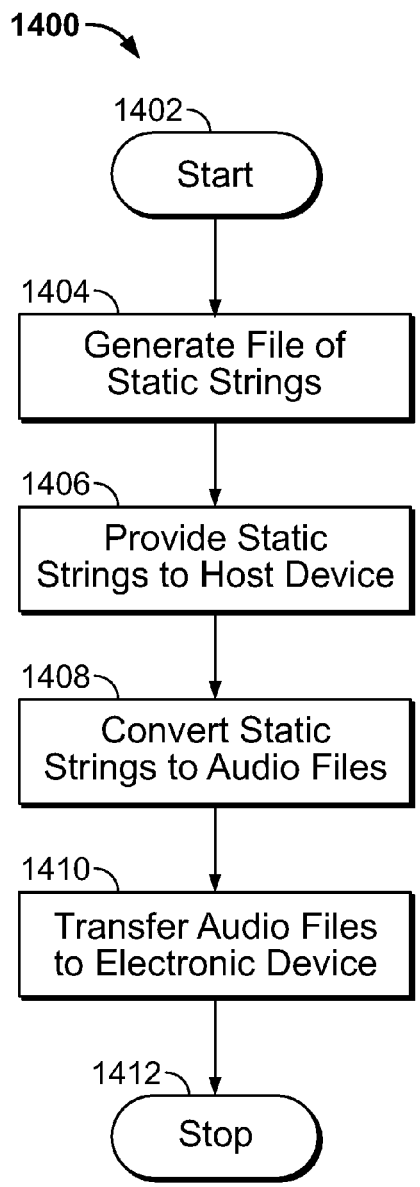
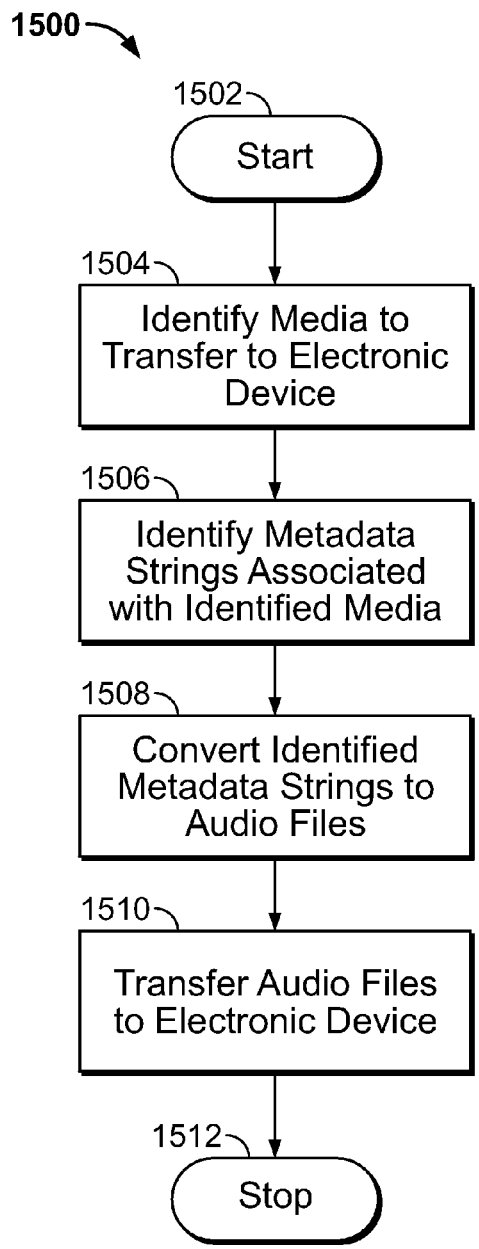
FIG. 14
FIG. 15

MULTI-TIERED VOICE FEEDBACK IN AN ELECTRONIC DEVICE

RELATED APPLICATION

This application is a continuation of U.S. application Ser. No. 12/205,780, filed Sep. 5, 2008, which is incorporated herein by reference in its entirety.

BACKGROUND OF THE INVENTION

This invention is directed to providing multi-tiered voice feedback in an electronic device.

Many electronic devices provide a significant number of features or operations accessible to a user. The number of available features or operations may often exceed the number of inputs available using an input mechanism of the electronic device. To allow users to access electronic device operations that are not specifically tied to particular inputs (e.g., inputs not associated with a key sequence or button press, such as a MENU button on an iPod, available from Apple Inc.), the electronic device may provide menus with selectable options, where the options are associated with electronic device operations. For example, an electronic device may display a menu with selectable options on a display, for example in response to receiving an input associated with the menu from an input mechanism (e.g., a MENU button).

Because the menu is typically displayed on an electronic device display, a user may be required to look at the display to select a particular option. This may sometimes not be desirable. For example, if a user desires to conserve power (e.g., in a portable electronic device), requiring the electronic device to display a menu and move a highlight region navigated by the user to provide a selection may use up power. As another example, if a user is in a dark environment and the display does not include back lighting, the user may not be able to distinguish displayed options of the menu. As still another example, if a user is blind or visually impaired, the user may not be able to view a displayed menu.

To overcome this issue, some systems may provide audio feedback in response to detecting an input from a user or a change in battery status, as described in commonly assigned U.S. Patent Publication No. 2008/0129520, entitled ELECTRONIC DEVICE WITH ENHANCED AUDIO FEEDBACK, filed Dec. 1, 2006, which is incorporated by reference herein in its entirety. In some cases, the electronic device may provide voice feedback describing options that a user may select or operations that the user may direct the electronic device to perform. If several menus are simultaneously displayed, or if a display includes different modules or display areas (e.g., several views), the electronic device may have difficulty determining the objects or menu options, or the order of objects or menu options, for which to provide a voice feedback.

SUMMARY OF THE INVENTION

This invention is directed to systems and methods for providing multi-tiered voice feedback to a user. In particular, this invention is directed to providing voice feedback for several displayed objects (e.g., menu items) in a predetermined order (e.g., based on tiers associated with each displayed object).

In some embodiments, a method, electronic device, and computer readable media for providing voice feedback to a user of an electronic device may be provided. The electronic device may display several elements and identify at least two of the elements for which to provide voice feedback. The electronic device may determine a tier associated with the display of each of the identified elements, where the tier defines the relative importance of each displayed element. The electronic device may then provide voice feedback for the identified elements in an order of the determined tiers, for example such that voice feedback is first provided for the most important element, and subsequently provided for the next most important element until voice feedback has been provided for each element.

In some embodiments, a method, electronic device, and computer readable media for providing audio feedback for displayed content may be provided. The electronic device may direct a display to display several elements, where speakable properties are associated with at least two of the elements. The electronic device may determine a tier associated with each of the at least two elements and generate a queue that includes the at least two elements. The determined tiers may set the order of the elements in the generated queue. The electronic device may direct an audio output to sequentially speak each queue element in the order of the queue, where the audio output includes voice feedback associated with each of the at least two elements.

In some embodiments, a method, electronic device and computer readable media for speaking the text of elements displayed by an electronic device may be provided. The electronic device may display several elements with which speakable properties are associated. The speakable properties may identify, for each element, text to speak. The electronic device may display the several elements in several views, where each view is associated with speakable order. The electronic device may generate a queue that includes the several elements, where the order of the elements in the queue is set from the speakable order of each view (e.g., such that elements with a higher speakable order are at the beginning of the queue). The electronic device may wait for a first timeout to lapse and identify audio files associated with each of the elements of the queue. During the first timeout, the electronic device may modify audio playback to make speech easier to hear and to prevent the electronic device from speaking while a transaction is detected. The audio files may include the spoken speakable property text to speak for each element. The electronic device may sequentially play back the identified audio files in the order of the queue and pause for a second timeout. The second timeout may allow the electronic device to return audio playback to the pre-speaking configuration (e.g., music playback). In some embodiments, the electronic device may receive the audio files from a host device that generates the audio files using a text to speech engine from the speakable property text to speak for each element.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 14 is a flowchart of an illustrative process for providing static strings to an electronic device; and FIG. 15 is a flowchart of an illustrative process for providing dynamic strings to an electronic device.

DETAILED DESCRIPTION

Figure 1:
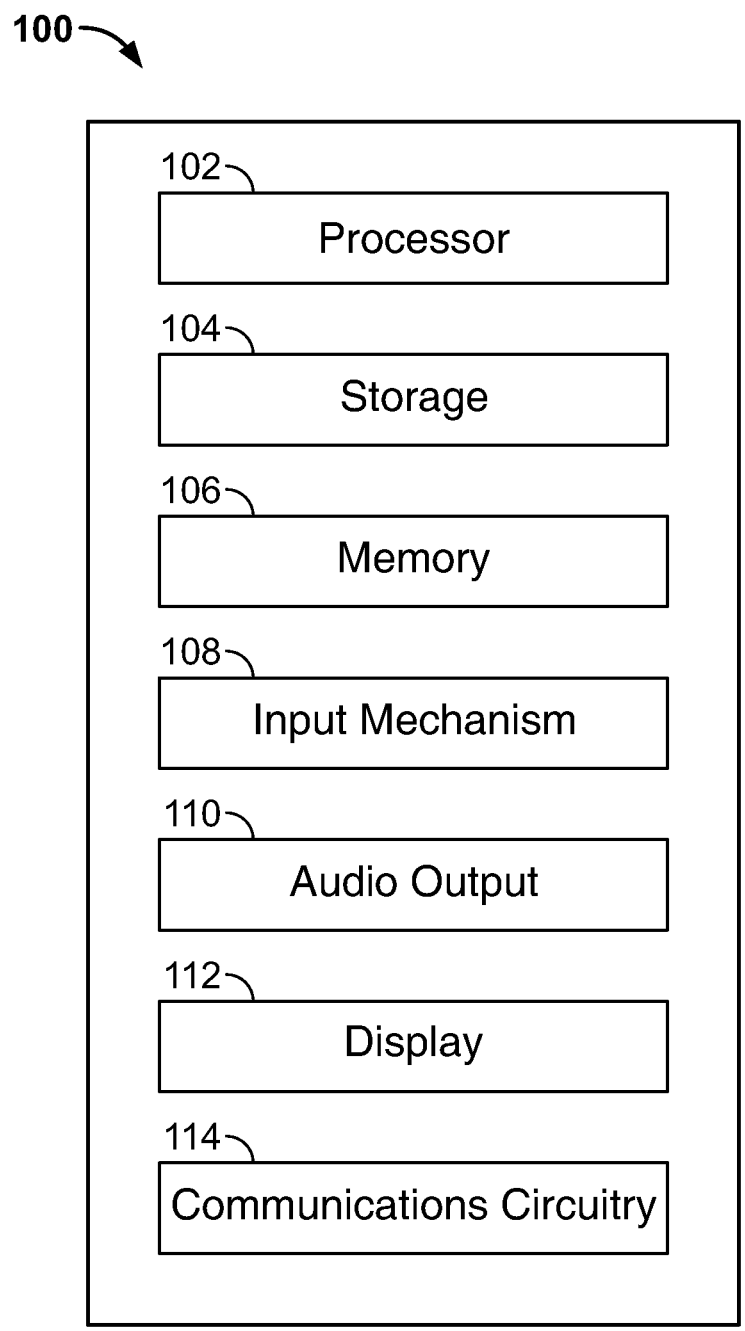
FIG. 1 is a schematic view of a electronic device in accordance with one embodiment of the invention.

An electronic device operative to provide selective voice feedback based on tiers associated with displayed options is provided.

The electronic device may include a processor and a display. The electronic device may display any suitable information to the user. For example, a display may include a title bar, a menu with selectable options, an information region for displaying information related to one or more options, information identifying media or files available for selection, or any other suitable information. As the user accesses the display, the electronic device may provide voice feedback for the different displayed elements.

Each displayed element may be associated with different properties. In some embodiments, displayed elements for which voice feedback is to be provided may be associated with a speakable property. The speakable property may include the text to be spoken for the associated element. In addition, each element, as part of a view implemented for displaying the element, may be associated with a speakable order or tier. As an electronic device displays elements (e.g., as part of the view), the electronic device may determine, from the speakable properties and the speakable orders, the text for which to provide voice feedback (e.g., the text to speak) and the order or tiers associated with each element. The electronic device may select the element having the highest tier and provide voice feedback (e.g., speak) for the selected element. The electronic device may then successively select each element having the next highest tier and provide voice feedback for the subsequent elements in tier order (e.g., using a queue in which the order of elements is set by the tiers associated with each element). Elements that do not include a speakable property or speakable order (e.g., elements for which no voice feedback is provided) may be ignored or skipped by the electronic device as it provides voice feedback.

The electronic device may determine which element to speak at a particular time using any suitable approach. In some embodiments, the electronic device may provide voice feedback in response to detecting a transaction (e.g., a decision regarding what elements can be spoken). For example, the electronic device may detect a transaction in response to determining that the display has transitioned, or in response to receiving a user action causing the display to change (e.g., the user selected an option or moved a highlight region). In response to detecting a transaction, the electronic device may identify the speakable elements of the updated display, and the tiers associated with the speakable elements (e.g., elements within the transaction to speak in order). The electronic device may then create a new queue of elements for which voice feedback is to be provided based on the identified elements of the updated display, and provide voice feedback based on the newly created queue. In some embodiments, the new queue may be constructed by replacing unspoken equal or lower tier items of an existing queue. The particular elements spoken, and the order in which the elements are spoken may change with each transaction.

The audio files that are played back in response to receiving an instruction to provide voice feedback for a particular displayed element may be generated using any suitable approach. In some embodiments, to provide high quality audio using a text to speech (TTS) engine, the audio files may be received from a host device connected to the electronic device. This approach may be particularly desirable if the electronic device has limited resources (e.g., inherent memory, processing and power limitations due to the portability of the electronic device). The electronic device may provide a host device with a file listing strings associated with each element to be spoken by the device. The host device may then convert the strings to speech using a text-to-speech engine and provide the audio files of the speech to the electronic device. The electronic device may then consult a mapping of strings to audio files to provide the proper audio file for playback in response to determining that voice feedback for a displayed element is to be provided.

FIG. 1 is a schematic view of a electronic device in accordance with one embodiment of the invention. Electronic device 100 may include processor 102, storage 104, memory 106, input mechanism 108, audio output 110, display 112, and communications circuitry 114. In some embodiments, one or more of electronic device components 100 may be combined or omitted (e.g., combine storage 104 and memory 106). In some embodiments, electronic device 100 may include other components not combined or included in those shown in FIG. 1 (e.g., a power supply or a bus), or several instances of the components shown in FIG. 1. For the sake of simplicity, only one of each of the components is shown in FIG. 1.

Processor 102 may include any processing circuitry operative to control the operations and performance of electronic device 100. For example, processor 100 may be used to run operating system applications, firmware applications, media playback applications, media editing applications, or any other application. In some embodiments, a processor may drive a display and process inputs received from a user interface.

Storage 104 may include, for example, one or more storage mediums including a hard-drive, solid state drive, flash memory, permanent memory such as ROM, any other suitable type of storage component, or any combination thereof. Storage 104 may store, for example, media data (e.g., music and video files), application data (e.g., for implementing functions on device 100), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that may enable electronic device 100 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 106 can include cache memory, semi-permanent memory such as RAM, and/or one or more different types of memory used for temporarily storing data. In some embodiments, memory 106 can also be used for storing data used to operate electronic device applications, or any other type of data that may be stored in storage 104. In some embodiments, memory 106 and storage 104 may be combined as a single storage medium.

Input mechanism 108 may provide inputs to input/output circuitry of the electronic device. Input mechanism 108 may include any suitable input mechanism, such as for example, a button, keypad, dial, a click wheel, or a touch screen. In some embodiments, electronic device 100 may include a capacitive sensing mechanism, or a multi-touch capacitive sensing mechanism. Some sensing mechanisms are described in commonly owned U.S. patent application Ser. No. 10/902,964, filed Jul. 10, 2004, entitled "Gestures for Touch Sensitive Input Device," and U.S. patent application Ser. No. 11/028,590, filed Jan. 18, 2005, entitled "Mode-Based Graphical User Interfaces for Touch Sensitive Input Device," both of which are incorporated herein in their entirety.

Audio output 110 may include one or more speakers (e.g., mono or stereo speakers) built into electronic device 100, or an audio connector (e.g., an audio jack or an appropriate Bluetooth connection) operative to be coupled to an audio output mechanism. For example, audio output 110 may be operative to provide audio data using a wired or wireless connection to a headset, headphones or earbuds.

Display 112 may include display circuitry (e.g., a screen or projection system) for providing a display visible to the user. For example, display 112 may include a screen (e.g., an LCD screen) that is incorporated in electronic device 100. As another example, display 112 may include a movable display or a projecting system for providing a display of content on a surface remote from electronic device 100 (e.g., a video projector). In some embodiments, display 112 can include a coder/decoder (Codec) to convert digital media data into analog signals. For example, display 112 (or other appropriate circuitry within electronic device 100) may include video Codecs, audio Codecs, or any other suitable type of Codec.

Display 112 also can include display driver circuitry, circuitry for driving display drivers, or both. Display 112 may be operative to display content (e.g., media playback information, application screens for applications implemented on the electronic device, information regarding ongoing communications operations, information regarding incoming communications requests, or device operation screens) under the direction of processor 102.

One or more of input mechanism 108, audio output 110 and display 112 may be coupled to input/output circuitry. The input/output circuitry may be operative to convert (and encode/decode, if necessary) analog signals and other signals into digital data. In some embodiments, the input/output circuitry can also convert digital data into any other type of signal, and vice-versa. For example, the input/output circuitry may receive and convert physical contact inputs (e.g., from a multi-touch screen), physical movements (e.g., from a mouse or sensor), analog audio signals (e.g., from a microphone), or any other input. The digital data can be provided to and received from processor 102, storage 104, memory 106, or any other component of electronic device 100. In some embodiments, several instances of the input/output circuitry can be included in electronic device 100.

Communications circuitry 114 may be operative to communicate with other devices or with one or more servers using any suitable communications protocol. Electronic device 100 may include one more instances of communications circuitry for simultaneously performing several communications operations using different communications networks. For example, communications circuitry may support Wi-Fi (e.g., a 802.11 protocol), Ethernet, Bluetooth™ (which is a trademark owned by Bluetooth Sig, Inc.), radio frequency systems, cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof. In some embodiments, communications circuitry 114 may include one or more communications ports operative to provide a wired communications link between electronic device 100 and a host device. For example, a portable electronic device may include one or more connectors (e.g., 30 pin connectors or USB connectors) operative to receive a cable coupling the portable electronic device to a host computer. Using software on the host computer (e.g. iTunes available from Apple Inc.), the portable electronic device may communicate with the host computer.

In some embodiments, electronic device 100 may include a bus operative to provide a data transfer path for transferring data to, from, or between control processor 102, storage 104, memory 106, input/output circuitry 108, sensor 110, and any other component included in the electronic device.

Figures 2, 3:
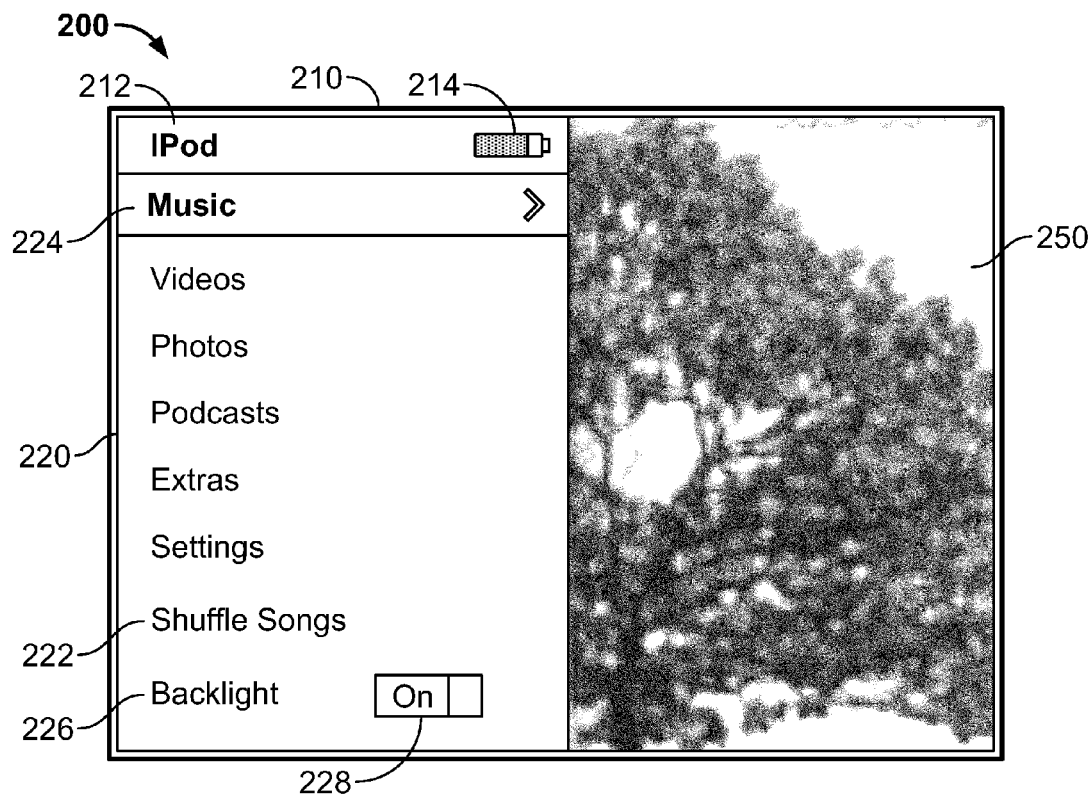
FIG. 2 is a schematic view of an illustrative display screen having content for which voice feedback may be available in accordance with one embodiment of the invention.
FIG. 3 is a schematic view of an illustrative queue of speakable items for playback associated with the display of FIG. 2 in accordance with one embodiment of the invention.

The electronic device may provide voice feedback for any suitable displayed content, including for example menu options or content available for playback to a user (e.g., voice feedback for metadata associated with media, such as an artist name, media title, or album). FIG. 2 is a schematic view of an illustrative display screen having content for which voice feedback may be available in accordance with one embodiment of the invention. Display 200 may include several areas on which content is displayed. For example, display 200 may include title bar 210, menu 220 and additional information 230. Title bar 210 may include title 212 indicating the mode or application in use by the electronic device. For example, title 212 may include iPod (e.g., the top most title when no application has been selected), Music, Videos, Photos, Podcasts, Extras, and Settings. Other titles may be available, for example when an accessory device is coupled to the electronic device (e.g., a radio accessory or workout accessory). Title bar 210 may also include any other suitable information, including for example battery indicator 214.

Menu 220 may include several selectable options 222, including for example options for selecting a mode or application, or options associated with a particular selected mode or application. A user may select an option from menu 220 by navigating highlight region 224 over an option. The user may provide a selection instruction (e.g., by pressing a button or providing any other suitable input) while the highlight region is over a particular option to select the particular option. Additional information 230 may include any suitable information, including for example information associated with the mode or application identified by title 212, one or more displayed options 222, the particular option identified by highlight region 224, or any other suitable information.

The electronic device may generate display 200, or any other display using any suitable approach. In some embodiments, a Model-View-Controller (MVC) architecture or design may be used. The model may include any suitable information coupled to a view for display by a controller (e.g., the controller may query the model to construct views, or modify a view's connection to a model at runtime). For example, a model may include one or more strings or images. Each view may be configured to display (e.g., support) one or more types of element. The view may pass the supported types to a get_Property call, in response to which the model may provide data associated with the supported type to the view for display by the device. Several views may be combined to form each display. For example, display 200 may include at least one view for each area of the display.

To facilitate providing voice feedback for displayed content, the electronic device may incorporate voice feedback variables and settings in the MVC architecture associated with the actual display of content. In some embodiments, the model may include an additional speakable property field. The speakable property field may include any suitable information necessary or useful for providing voice feedback. In some embodiments, the speakable property field may include an indication that voice feedback is to be provided (e.g., a toggled setting). The electronic device may determine the text to speak using any suitable approach. In some embodiments, the view or scheduling system may query the property ID of the type associated with the view. In some embodiments, a fixed size ID generated from a property ID (e.g., using a hash table) may instead or in addition be provided to identify the text for which to provide voice feedback. In some embodiments, the speakable property may instead or in addition include a string of text to be spoken by the electronic device, or a pointer to the field having the text to be displayed in the model.

The electronic device may incorporate the tier or importance in any suitable component of the MVC architecture, including for example as a speakable order variable associated with each view. The speakable order may provide an indication of the importance of the speakable element displayed in the corresponding view, for example relative other text in other views that may be displayed. The indication may include, for example, a tier of speech. The electronic device may define any suitable speakable order or tier, including for example, context (e.g., associated with menu titles), focus (e.g., list control, such as highlight region position), choice (e.g., an option associated with an item on a list), property (e.g., a detailed description or lyrics for media), detail, and idle. Each view may be associated with one or more tiers or speakable orders, for example based on the model or elements displayed in the view. For example, a view may be associated with several tiers if a menu option and associated setting (e.g., Backlight option 224 and setting 226) are simultaneously displayed within a view. Alternatively, the menu option and setting may be provided in different views.

If a view or several views are displayed as part of a display, the electronic device may retrieve from the model the elements to display, and the manner in which to display the elements. In addition, the electronic device may retrieve the speakable properties from each model and the speakable order from each displayed view. The electronic device may provide voice feedback for any suitable speakable element of a display. For example, the electronic device may provide voice feedback for one or more views. As another example, the electronic device may provide voice feedback for one or more elements in a particular view. In some embodiments, the electronic device may provide voice feedback, in a particular view, for only one element at each tier (e.g., provide voice feedback for only one element in menu 220, where each option is associated with a particular tier).

To provide voice feedback for displayed speakable elements in the proper order, a speech scheduler of the electronic device may define a queue of items for which to provide voice feedback (e.g., speakable items) in which the speakable order or tier sets the order of the elements in the queue. The electronic device may speak any suitable combination of displayed elements. For example, the electronic device may speak only one menu item (e.g., the menu item identified by a highlight region). As another example, the electronic device may speak several menu items (e.g., all menu items that come after the highlighted menu item). As still another example, the electronic device may speak all menu items. To ensure that the electronic device first speaks the menu item identified by the highlight region, the electronic device may associate a higher tier or order to the corresponding menu item. This discussion will interchangeably use the terms "speaking" a speakable element or string and "playing an audio file" associated with a speakable element or string to describe providing voice feedback for a speakable element.

In some embodiments, the speech scheduler may only include one speakable element for each tier of each view in the queue. This may provide an easy mechanism, for example, for the electronic device to speak only a menu item that is highlighted (e.g., only speak "Music" and not the other items in menu 220 by assigning the Focus tier only to the "Music" menu option). If, within a transaction, several displayed items change within a view at a given tier, the speech scheduler may only place the most recent changed item in the queue. To provide voice feedback for several items associated with a same speakable order in a single transaction, the electronic device may display the several items in distinct views associated with the same speakable order. The speech scheduler may use any suitable approach for providing voice feedback for different elements of views having the same tier (e.g., Idle tier in a Now Playing display, described below in more detail). For example, the speech scheduler may follow the order of the elements in one or more resource files, an order based on the graphical position of the views, alphabetically, or using any suitable order.

FIG. 3 is a schematic view of an illustrative queue of speakable items for playback associated with the display of FIG. 2 in accordance with one embodiment of the invention. Queue 300 may be depicted using any suitable approach. In the example of FIG. 3, queue 300 may include list 310 of speakable strings to speak successively. Each speakable string, as part of a view, may be associated with a speakable tier, identified in corresponding column 340. Using the elements from display 200 (FIG. 2), the speakable strings may include iPod string 312 having Context tier 342 and Music string 313 having Focus tier 343 (e.g., the menu item identified by the highlight region is the only one spoken). In implementations in which all menu items are spoken (e.g., and not only the menu items identified by a highlight region), the speakable strings may include a Videos string, a Photos string, a Podcasts string, an Extras string, a Settings string, a Shuffle Songs string, and a Backlight string, for example all having Choice tiers (e.g., a tier below the Focus tier of Music string 313). In addition, because the Backlight option may be displayed with an associated setting, queue 300 may also include an On string associated with a Properties tier, which may be spoken after the Backlight string is spoken. In implementations in which only the highlighted option is spoken, the electronic device may assign a Focus tier to the Backlight string and a Choice tier to the On string in response to detecting that the highlight region has been placed over the Backlight option in the menu. The electronic device may identify audio files associated with each of the speakable strings (e.g., using a hash or database) and successively play back each of the identified audio files in the order set by queue 300.

Figure 4:
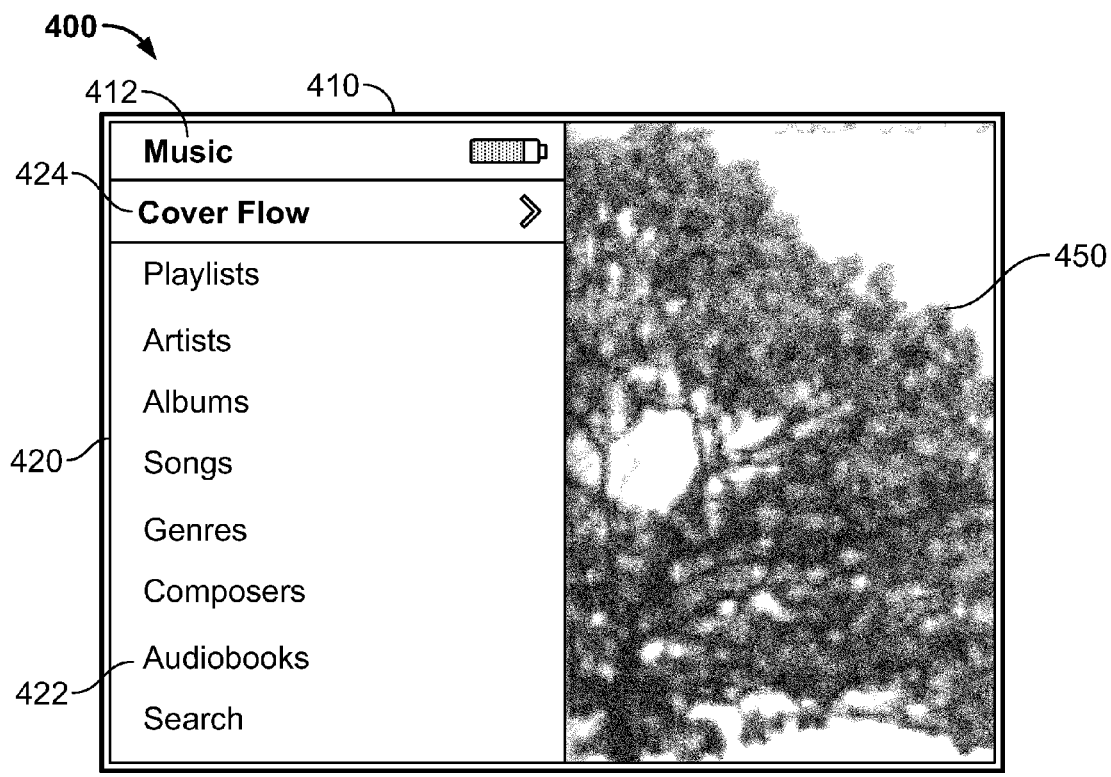
FIG. 4 is a schematic view of an electronic device display after receiving a user selection of an option of the display of FIG. 2 in accordance with one embodiment of the invention.

When the content on the electronic device display changes, the electronic device may modify the voice feedback provided to reflect the changed display. FIG. 4 is a schematic view of an electronic device display after receiving a user selection of an option of the display of FIG. 2 in accordance with one embodiment of the invention. Similar to display 200 (FIG. 2), display 400 may include several areas on which content is displayed. For example, display 400 may include title bar 410, menu 420 and additional information 430. Title bar 410 may include title 412 indicating the mode or application in use by the electronic device. In the example of FIG. 4, title 412 may include Music, indicating the option from menu 220 (FIG. 2) that was selected.

Menu 420 may include several selectable options 422, including for example options associated with a particular selected mode or application. A user may select an option from menu 420 by navigating highlight region 424 over the option. The user may provide a selection instruction (e.g., by pressing a button or providing any other suitable input) while the highlight region is over a particular option to select the particular option. In the example of FIG. 4, options 422 may include Cover Flow, Playlists, Artists, Albums, Songs, Genres, Composers, Audiobooks, and Search. Additional information 430 may include any suitable information, including for example information associated with the mode or application identified by title 412, one or more displayed options 422, the particular option identified by highlight region 424, or any other suitable information.

Figure 5:
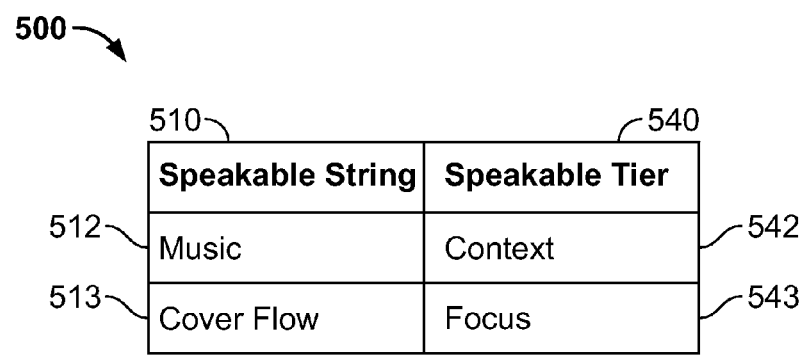
FIG. 5 is a schematic view of an illustrative queue of speakable items for playback associated with the display of FIG. 4 in accordance with one embodiment of the invention.

In response to determining that the displayed content has changed (e.g., in response to detecting a transaction), the speech scheduler may update or revise the queue of speakable items providing voice feedback for the display. For example, the speech scheduler may determine the speakable properties associated with each view of the changed display to generate the queue. FIG. 5 is a schematic view of an illustrative queue of speakable items for playback associated with the display of FIG. 4 in accordance with one embodiment of the invention. Queue 500 may be depicted using any suitable approach. In the example of FIG. 5, queue 500 may include list 510 of speakable strings to speak successively. Each speakable string, as part of a view, may be associated with a speakable tier, identified in corresponding column 540. Using the elements from display 400 (FIG. 4), the speakable strings may include Music string 512 having Context tier 542 and Cover Flow string 513 having Focus tier 543 (e.g., the menu option identified by the highlight region). In implementations where all menu items are spoken, queue 500 may include a Playlists string, an Artists string, an Albums string, a Songs string, a Genres string, a Composers, an Audiobooks string, and a Search string, for example all having a Choice tier (e.g., a tier below Focus tier 543 of Cover Flow string 513). The electronic device may identify audio files associated with each of the speakable strings (e.g., using a hash or database) and successively play back each of the identified audio files in the order set by queue 500.

Figure 6:
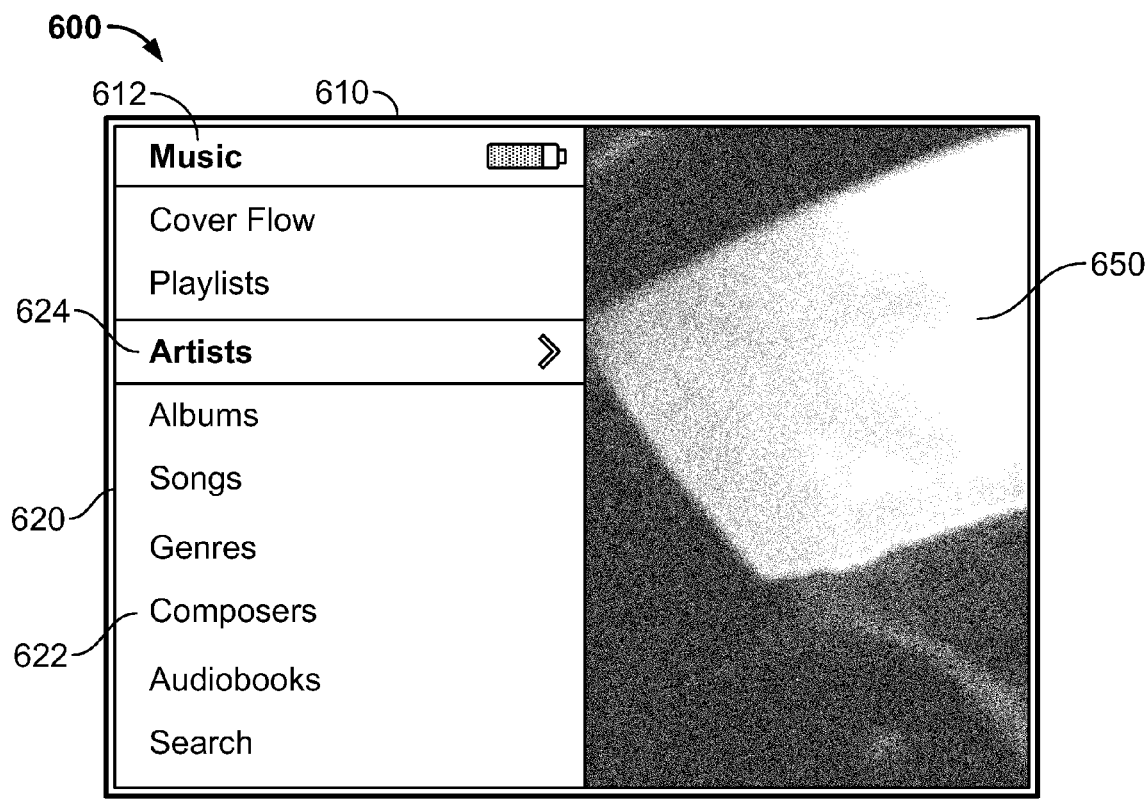
FIG. 6 is a schematic view of the electronic device display of FIG. 4 having a different marked option in accordance with one embodiment of the invention.

In some embodiments, the voice feedback provided by the electronic device may change when the displayed content remains the same, but when a marker controlled by the user (e.g., a highlight region) changes. This may allow a user to identify the action that will be performed in response to a user selection of the option identified by the marker as the user moves the marker. FIG. 6 is a schematic view of the electronic device display of FIG. 4 having a different marked option in accordance with one embodiment of the invention. Similar to display 400 (FIG. 4), display 600 may include several areas on which content is displayed. For example, display 600 may include title bar 610, menu 620 and additional information 630. Title bar 610 may include title 612 indicating the mode or application in use by the electronic device, which may be the same mode (e.g., Music) as display 400.

Menu 620 may include the same selectable options 622 as display 400. As shown in FIG. 6, a user may have navigated highlight region 624 over an Artist option (e.g., instead of a Cover Flow option as in display 400). The displayed additional information 630 may include any suitable information, including for example information associated with the mode or application identified by title 612, one or more displayed options 622, the particular option identified by highlight region 624, or any other suitable information. In the example of FIGS. 4 and 6, the additional information displayed may be different, reflecting the position of highlight region 624.

Figure 7:
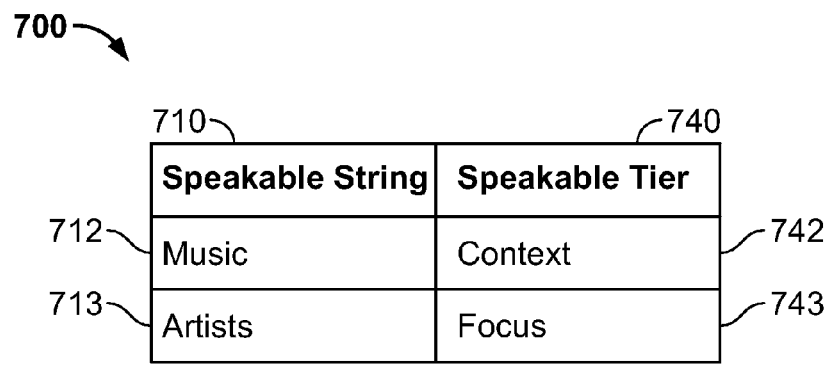
FIG. 7 is a schematic view of an illustrative queue of speakable items for playback associated with the display of FIG. 6 in accordance with one embodiment of the invention.

In response to determining that the position of the highlight region has changed (e.g., in response to detecting a transaction), the speech scheduler may update the queue of speakable items providing voice feedback for the display. For example, the speech scheduler may determine the revised, modified or updated speakable properties associated with each view of the changed display to generate the queue. FIG. 7 is a schematic view of an illustrative queue of speakable items for playback associated with the display of FIG. 6 in accordance with one embodiment of the invention. Queue 700 may be depicted using any suitable approach. In the example of FIG. 7, queue 700 may include list 710 of speakable strings to speak successively. Each speakable string, as part of a view, may be associated with a speakable tier, identified in corresponding column 740. Using the elements from display 600 (FIG. 6), the speakable strings may include Music string 712 having Context tier 742 and Artists string 713 having Focus tier 743 (e.g., the menu option identified by the highlight region). In particular, the listing of speakable strings in queue 700 may be different than that of queue 500 (FIG. 5) to reflect that the highlight region moved down to the Artists option. For example, the speakable strings that would be spoken in queue 500 before queue 700 may be removed from queue 700. The electronic device may identify audio files associated with each of the speakable strings (e.g., using a hash or database) and successively play back each of the identified audio files in the order set by queue 700. In implementations where voice feedback for non-highlighted menu options is provided, queue 700 may include an Albums string, a Songs string, a Genres string, a Composers, an Audiobooks string, a Search string, a Cover Flow string, and a Playlists string, for example all having a Choice tier (e.g., a tier below Focus tier 743 of Artist string 713). The other menu options may be ordered in any suitable manner, including for example as a repeating list that begins with the menu item identified by the highlight region.

The electronic device may play back any portion of a speakable option audio file in response to detecting a transaction. In some embodiments, if the electronic device begins playing back the audio files associated with display 200 when the user provides an instruction to access display 400, or the audio files associated with the speakable strings of display 400 as the user moves the highlight region to the position reflected in display 600, the electronic device may selectively stop playing back the audio file or continue playing back the audio file based on at least one of the tier associated with the audio file and the modification of the speech scheduler queue of speakable items. In some embodiments, the speech scheduler may first determine the updated queue, and compare the initial queue to the updated queue. In particular, the speech scheduler may determine, from the beginning of the queues, the portions of the initial queue and updated queue that remain the same, and the position of the updated queue from which the order of speakable elements changes. For example, as the speech scheduler moves from queue 300 to queue 500, the speech scheduler may determine that the queues do not share any common speakable strings and therefore are different from the first position. As another example, as the speech scheduler moves from queue 500 to queue 700, the speech scheduler may determine that the queues share the speakable string associated with the Context tier, but differ starting with the speakable string associated with the Focus tier.

The speech scheduler may further determine the position on each of the initial queue and the updated queue (if present) of the speakable string for which audio is currently being provided. For example, as the speech scheduler moves from queue 500 to queue 700, the speech scheduler may determine whether the speakable string for which an audio file is played back is the speakable string "Music" (e.g., the speakable string shared by queues 500 and 700) or a different speakable string (e.g., not shared by queues 500 and 700). If the speech scheduler determines that the currently spoken speakable string falls within the speakable strings shared by the initial and updated queues, the speech scheduler may continue to speak or play back the audio associated with the speakable string, and subsequently continue to play back audio associated with the speakable strings of the updated queue in the order set by the updated queue. For example, if the electronic device is playing back the audio associated with the speakable string "Music" (which has a Context tier) as the user causes the display to change from display 400 to display 600, the electronic device may provide the audio associated with the speakable string "Artists" (the next item in the queue associated with display 600) when the electronic device finishes playing back the audio associated with the speakable string "Music" (e.g., instead of the audio associated with the speakable string "Cover Flow," which was the next speakable string in the queue associated with display 400).

If the speech scheduler instead determines that the currently spoken speakable string does not fall within the range of speakable strings shared by the initial and updated queues, the electronic device may cease playing back the audio associated with the currently spoken speakable string. For example, the electronic device may cease playing back the audio as soon as the speech scheduler determines that the currently spoken speech is not within the range of shared speakable strings. The electronic device may then resume playing back audio associated with any suitable speakable string of the updated queue, including for example speakable strings of the updated queue starting with the speakable string of the updated queue from which the order of speakable elements changed. For example, if the electronic device is currently speaking the speakable string "Cover Flow" as the user causes the electronic device to move from display 400 to display 600, the electronic device may stop playing back the audio associated with the speakable string "Cover Flow" (e.g., and only play back the audio for "Cover") and begin playing back the audio associated with the speakable string "Artists" (e.g., the first speakable string of queue 700 that is different from queue 500). In implementations in which all menu items are spoken, if the electronic device is currently speaking the speakable string "Genres" as the user causes the electronic device to move from display 400 to display 600, the electronic device may stop playing back the audio associated with the speakable string "Genre" and begin playing back the audio associated with the speakable string "Artists." The speakable string "Genre" may then be spoken again when it is reached in the queue associated with display 600 (e.g., queue 700). Accordingly, if a user moves a highlight region along the options displayed in display 400 at an appropriate speed, the electronic device may only play back portions (e.g., the first syllables) of each of the options of display 400.

Figure 8:
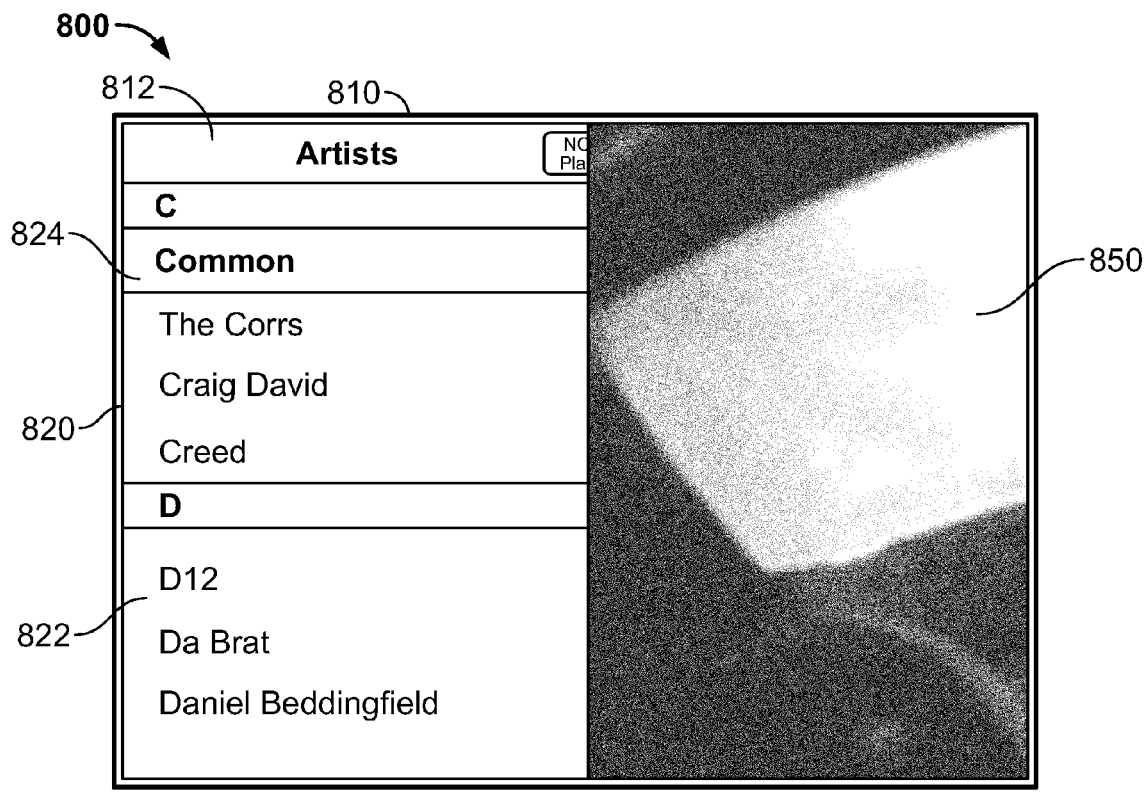
FIG. 8 is a schematic view of an electronic device display provided in response to a user selecting the highlighted menu option of FIG. 6 in accordance with one embodiment of the invention.

In some embodiments, the electronic device may provide voice feedback for menu items that are not statically provided by the electronic device firmware or operating system. For example, the electronic device may provide voice feedback for dynamic strings generated based on content provided by the user to the electronic device (e.g., from a host device). In some embodiments, the electronic device may provide voice feedback for media transferred to the electronic device by a user (e.g., based on metadata associated with the transferred media). FIG. 8 is a schematic view of an electronic device display provided in response to a user selecting the highlighted menu option of FIG. 6 in accordance with one embodiment of the invention. Similar to display 600 (FIG. 6), display 800 may include several areas on which content is displayed. For example, display 800 may include title bar 810, menu 820 and additional information 830. Title bar 810 may include title 812 indicating the mode or application in use by the electronic device (e.g., "Artists").

Menu 820 may include any suitable listing associated with "Artists" mode, including for example listing 822 of the artist names for media available to the electronic device (e.g., media stored by the electronic device). The electronic device may gather the artist names using any suitable approach, including for example from metadata associated with the media. The displayed additional information 830 may include any suitable information, including for example information associated with one or more artists identified in menu 820 (e.g., information related to the media available from the artist identified by highlight region 824), or the mode or application identified by title 612.

Figure 9:
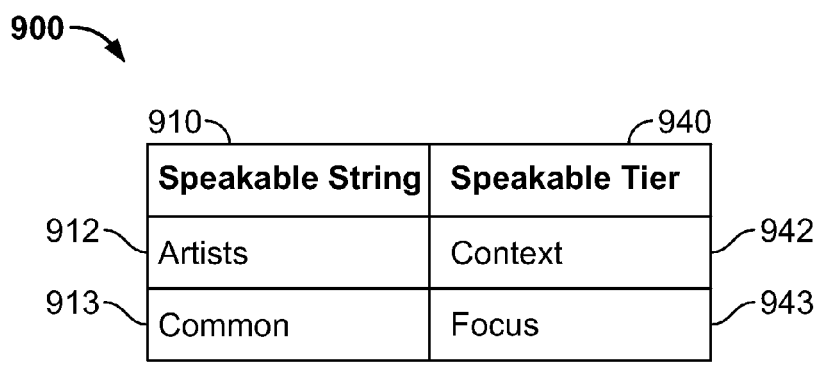
FIG. 9 is a schematic view of an illustrative queue of speakable items for playback associated with the display of FIG. 8 in accordance with one embodiment of the invention.

In response to detecting a transaction (e.g., a user selection of the Artists option in display 600, FIG. 6), the speech scheduler may update the queue of speakable items to reflect the displayed dynamic artist names. For example, the speech scheduler may determine the revised, modified or updated speakable properties associated with each view of the changed display to generate the queue. FIG. 9 is a schematic view of an illustrative queue of speakable items for playback associated with the display of FIG. 8 in accordance with one embodiment of the invention. Queue 900 may be depicted using any suitable approach. In the example of FIG. 9, queue 900 may include list 910 of speakable strings to speak successively. Each speakable string, as part of a view, may be associated with a speakable tier, identified in corresponding column 940. Using the elements from display 800 (FIG. 8), the speakable strings may include Artists string 912 having Context tier 942 and Common string 913 having Focus tier 943 (e.g., the artist identified by the highlight region). In implementations where voice feedback for non-highlighted menu options is provided, queue 900 may include a The Cons string, a Craig David string, a Creed string, a D12 string, a Da Brat string, and a Daniel Beddingfield string, for example all having a Choice tier (e.g., a tier below Focus tier 843 of Common string 813). The other artists may be ordered in any suitable manner, including for example as a repeating list that begins with the artist identified by the highlight region.

Figures 10, 11:
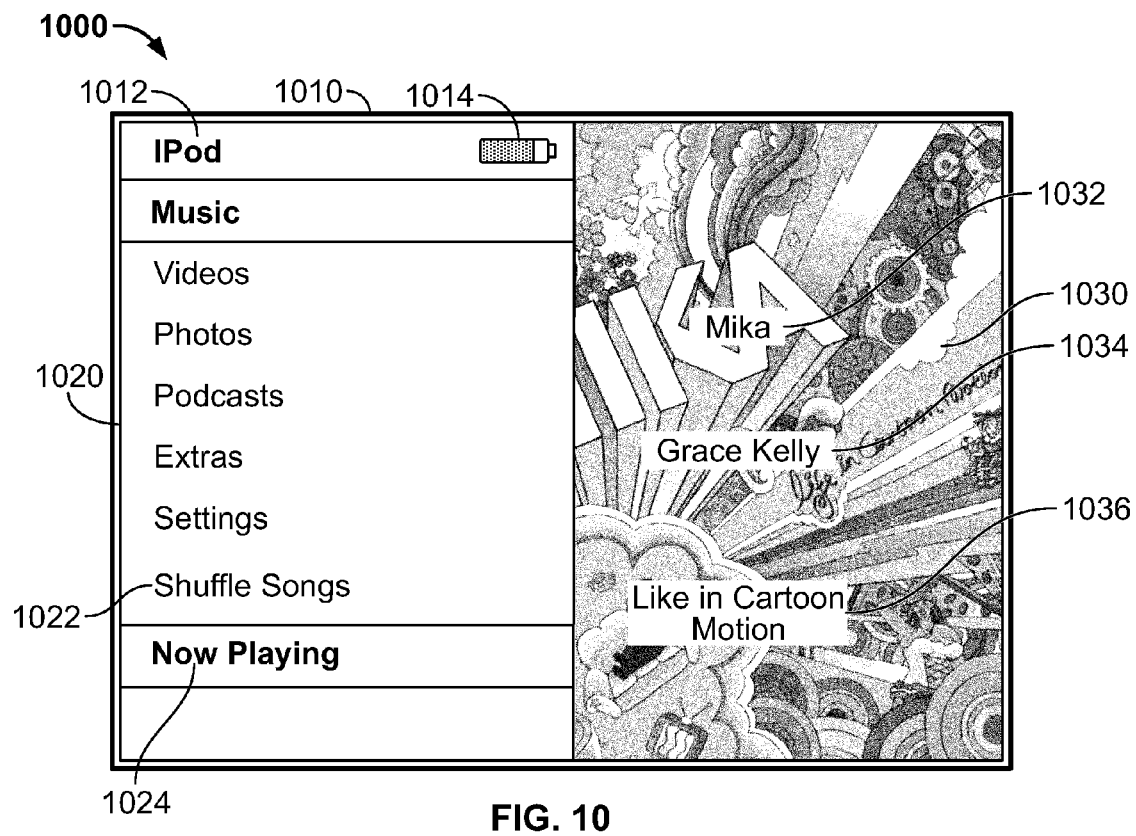
FIG. 10 is a schematic view of an illustrative "Now Playing" display in accordance with one embodiment of the invention.
FIG. 11 is a schematic view of an illustrative queue of speakable items for a Now Playing display in accordance with one embodiment of the invention.

In some embodiments, the electronic device may selectively provide voice feedback based on the status of media playback. For example, the electronic device may not provide voice feedback for particular elements or in a particular mode when the electronic device is playing back media. FIG. 10 is a schematic view of an illustrative "Now Playing" display in accordance with one embodiment of the invention. Display 1000 may include title bar 1010, menu 1020 and additional information 1030. Title bar 1010 may include title 1012 indicating the mode or application in use by the electronic device. For example, title 1012 may include iPod (e.g., the top most title when no application has been selected), Music, Videos, Photos, Podcasts, Extras, Settings, and Now Playing. Title bar 1010 may also include any other suitable information, including for example battery indicator 1014.

Menu 1020 may include several selectable options 1022, including for example options for selecting a mode or application, or options associated with a particular selected mode or application. A user may select an option from menu 1020 by navigating highlight region 1024 over an option. The user may provide a selection instruction (e.g., by pressing a button or providing any other suitable input) while the highlight region is placed over a particular option to select the particular option. For example, to view information related to media that is currently being played back (e.g., currently playing or paused media), the user may select a Now Playing option. In response to receiving a user selection of the Now Playing option, the electronic device may display additional information 1030 related to the now playing media. For example, additional information 1030 may include artist 1032, title 1034, and album 1036 overlaid on album art. In some embodiments, each of artist 1032, title 1034 and album 1036 may be associated with the same or different views (e.g., different views to allow for voice feedback of the additional information using the same tier for all of the additional information elements).

In response to receiving a selection of the Now Playing option of display 1000 (FIG. 10), the speech scheduler may update the queue of speakable items to speak one or more strings related to the now playing media. For example, the speech scheduler may determine the revised, modified or updated speakable properties associated with each view of the changed display to generate the queue. FIG. 11 is a schematic view of an illustrative queue of speakable items for a Now Playing display in accordance with one embodiment of the invention. Queue 1100 may be depicted using any suitable approach. In the example of FIG. 11, queue 1100 may include list 1110 of speakable strings to speak successively. Each speakable string, as part of a view, may be associated with a speakable tier, identified in corresponding column 1140. Using the elements from display 1000 (FIG. 10), the speakable strings may include iPod string 1112 having Context tier 1142, Now Playing string 1113 having Focus tier 1143 (e.g., the menu option identified by the highlight region), Mika string 1114 having Idle tier 1144, Grace Kelly string 1115 having Idle tier 1145, and Life in Cartoon Motion string 1116 having Idle tier 1146.

To ensure that voice feedback for the artist, title and album are not provided at inopportune times, the electronic device may not provide voice feedback for speakable elements associated with the Idle tier when media is playing back (e.g., not paused). For example, the electronic device may first determine whether media is playing back. In response to determining that no media is playing back, the electronic device may provide voice feedback for all of the elements in queue 1100, including the elements associated with the Idle tier. If the electronic device instead determines that media is currently being played back, the electronic device may provide voice feedback for elements in queue 1100 from views associated with tiers other than the Idle tier. The speech scheduler may, in response to detecting that media is playing back, remove elements associated with the Idle tier from queue 1100, or instead skip elements associated with Idle tier in queue 1100. The electronic device may assign an Idle tier to any suitable displayed information, including for example to information displayed in an additional information window or area (e.g., the number of songs or photos stored on the device).

Figure 12:
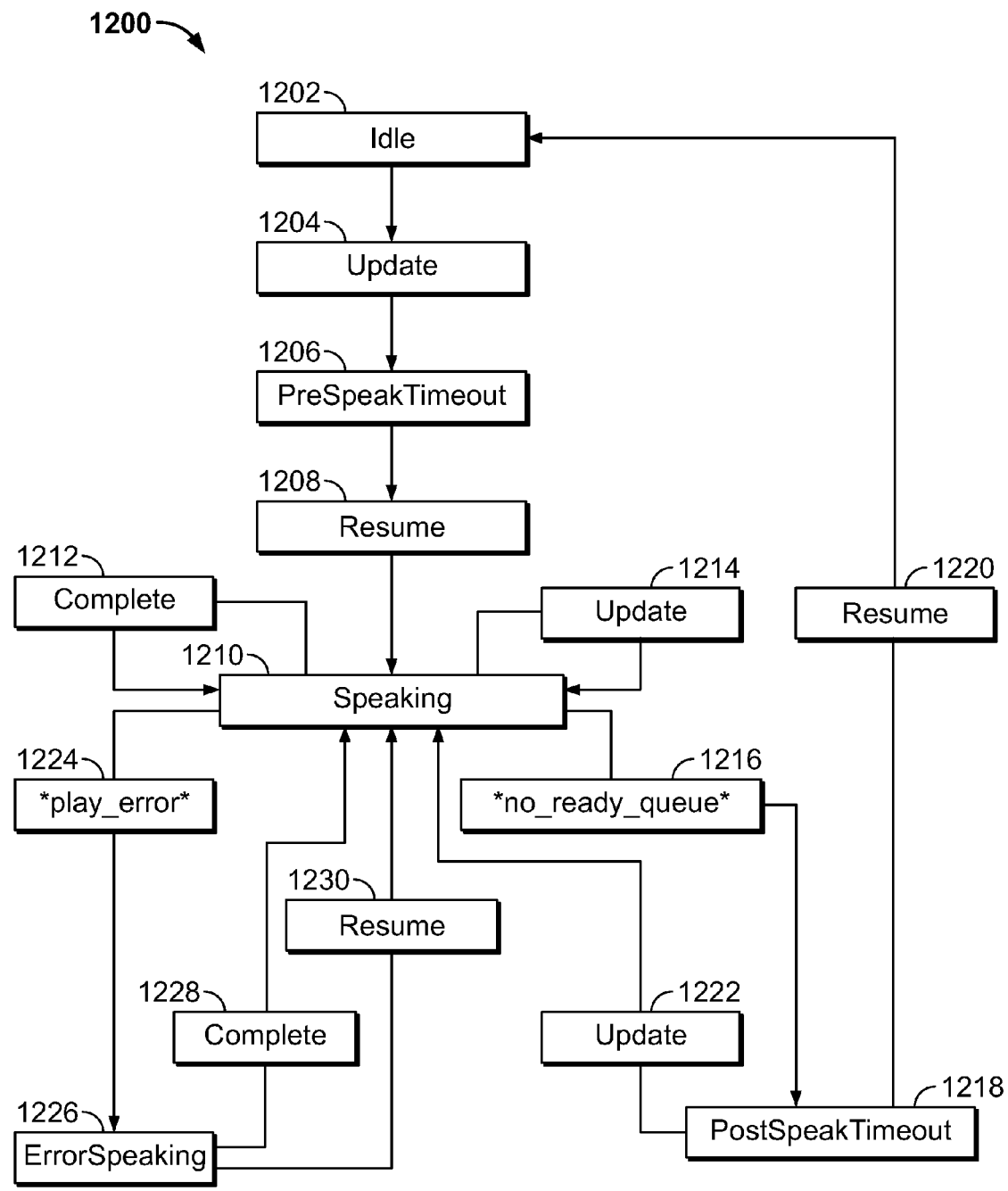
FIG. 12 is an illustrative state diagram for speaking speakable strings in accordance with one embodiment of the invention.

The electronic device may determine what strings to speak at what time using any suitable approach. FIG. 12 is an illustrative state diagram for speaking speakable strings in accordance with one embodiment of the invention. State diagram 1200 may include several states and several paths for accessing each of the several states. The electronic device may begin in Idle state 1202. For example, the electronic device may remain in the Idle state when no content is displayed. As another example, the electronic device may remain in the Idle state when content is displayed, but the displayed content is not associated with voice feedback (e.g., an album cover art is displayed). As still another example, the electronic device may remain in the Idle state when speakable content is displayed, but the speakable content has all been spoken.

While in Idle state 1202, the electronic device may monitor for transactions of the display. Any decision by the electronic device regarding what elements to speak may result in a transaction. A transaction may be initiated (and detected by the electronic device) using several different approaches. For example, a transaction may be detected in response to receiving a user instruction (e.g., a user selection of a selectable option causing the display to change). As another example, a transaction may be detected in response to a transition of the display (e.g., the display changing, for example due to a timeout or due to a user moving a highlight region). In response to detecting a transaction, the electronic device may move to Update step 1204. At Update step 1204, the electronic device may update the variables or fields associated with providing voice feedback. For example, a speech scheduler may generate a queue of items for the electronic device to speak, for example based on fields available from one or more models used to generate views for the post-transaction display. The electronic device may move to PreSpeakTimeout state 1206 after Update step 1204.

At PreSpeakTimeout state 1206, the electronic device may pause for a first timeout. During the timeout, the electronic device may perform any suitable operation, including for example generate the queues of speakable strings to speak, identify the audio files associated with the speakable strings and perform initial operations for preparing the audio files for playback, duck or fade prior audio outputs (e.g., outputs due to music playback), or perform any other suitable operation. For example, the electronic device may reduce prior audio feedback (e.g., ducking) so that the spoken string may be clearer. As another example, the electronic device may pause the playback of media during the voice feedback (e.g., so that the user does not miss any of the media). As still another example, the electronic device may use PreSpeakTimeout state to ensure that no more recent transactions are detected (e.g., a subsequent movement of a highlight region) to avoid partially speaking text. The electronic device may remain in PreSpeakTimeout state 1206 for any suitable duration, including for example a duration in the range of 0 ms to 500 ms (e.g., 100 ms). Once the first timeout associated with PreSpeakTimeout state 1206 has lapsed, the electronic device move to Resume step 1206 to access Speaking state 1210.

At Speaking state 1210, the electronic device may speak a speakable item placed in the queue generated during Update step 1204. For example, the electronic device may identify the audio file associated with a speakable item in the generated queue and play back the identified audio file. When the electronic device finishes speaking the first item in the voice feedback queue generated by the speech scheduler, the electronic device may determine that proper voice feedback has been provided and move to Complete step 1212. At Complete step 1212, the speech scheduler may remove the spoken speakable element from the queue or move a pointer to the next speakable element in the queue. In some embodiments, the electronic device may instead remove the speakable element from the queue just before speaking the element (e.g., while in Speaking state 1210) so that the first speakable element identified by the electronic device after Complete step 1212, as the electronic device returns to Speaking state 1210, is the next element to speak. The electronic device may successively move between Speaking state 1210 and Complete step 1212 until all of the speakable items in the queue generated during an Update step (e.g., Update step 1204) have been spoken (e.g., the queue is empty or the pointer has reached the end of the queue), or until the display is changed and a new Update step is performed.

In response to detecting a transaction (e.g., described above) while in Speaking state 1210, the electronic device may move to Update step 1214. At Update step 1214, the electronic device may update the variables or fields associated with providing voice feedback to conform to the display resulting from the transaction. For example, the speech scheduler may update the speakable elements, and the order of speakable elements for which to provide voice playback based on the display after the transaction, in an updated voice feedback queue. In some embodiments, the electronic device may in addition determine the portion of the updated queue, starting with the first speakable element of the queue, that matches the initial voice feedback queue (e.g., prior to step 1214), and identify the current speakable element for which voice feedback is being provided. If the electronic device determines that the current speakable element is within the portion of shared speakable elements of the initial and updated queues, the electronic device may return to Speaking state 1210 and continue to speak the next speakable element of the updated queue (e.g., using Complete step 1212 and Speaking state 1210). If the electronic device instead determines that the current speakable element is not within the portion of shared speakable elements of the initial and updated queues, the electronic device may cease speaking the current speakable element (e.g., stop playing back the audio file associated with the current speakable element) and return to Speaking state 1210. Upon returning to Speaking state 1210, the electronic device may provide voice feedback for the speakable elements of the updated queue, for example beginning with the first speakable element of the queue after the determined portion of shared speakable elements.

Once the electronic device has provided voice feedback for every element in the queue generated by the speech scheduler (e.g., once the queue is empty), the electronic device may move to no_ready_queue step 1216. At no_ready_queue step 1216, the electronic device may receive an indication that the queue of speakable items is empty from the speech scheduler (e.g., a no_ready_queue variable). From no_ready_queue step 1216, the electronic device may move to PostSpeakTimeout state 1218. At state 1218, the electronic device may pause for a second timeout. During the timeout, the electronic device may perform any suitable operation, including for example preparing other audio for playback, initializing an operation selected by a user (e.g., in response to detecting a selection instruction for one of the displayed and spoken menu options), or any other suitable operation. The electronic device may instead or in addition return audio output from a ducked or faded mode (e.g., enabled during PreSpeakTimeout state 1206 to a normal mode for playing back audio or other media). Alternatively, the electronic device may resume the playback of paused media. The electronic device may remain in PostSpeakTimeout state 1218 for any suitable duration, including for example a duration in the range of 0 ms to 500 ms (e.g., 100 ms). Once the first timeout associated with PostSpeakTimeout state 1218 has lapsed, the electronic device move to Resume step 1220 to return to Idle state 1202.

In some embodiments, the electronic device may detect a transaction (e.g., described above) while in PostSpeakTimeout state 1218 and move to Update step 1222. Update step 1222 may include some or all of the features of Update step 1214. At Update step 1222, the electronic device may update the variables or fields associated with providing voice feedback to conform to the display resulting from the transaction. For example, the speech scheduler may update the speakable elements, and the order of speakable elements for which to provide voice playback based on the display after the transaction, in an updated voice feedback queue. In some embodiments, the electronic device may in addition determine the portion of the updated queue, starting with the first speakable element of the queue, that matches the initial voice feedback queue (e.g., prior to step 1222), and identify the current speakable element for which voice feedback is being provided (e.g., as described above in connection with Update step 1214). The electronic device may then return to Speaking state 1210 and provide voice feedback for the speakable elements of the updated queue, for example beginning with the first speakable element of the queue after the determined portion of shared speakable elements.

In some embodiments, the electronic device may detect an error in the speaking process. For example, the electronic device may receive, at play_error step 1224, an indication of an error associated with Speaking state 1210. The electronic device may receive any suitable indication of an error at step 1224, including for example a play_error variable. The electronic device may then reach ErrorSpeaking state 1226. The electronic device may perform any suitable operation in ErrorSpeaking state 1226. For example, the electronic device may perform a debugging operation, or other operation for identifying the source of the error. As another example, the electronic device may gather information associated with the error to provide to the developer of the software for debugging or revision. If the electronic device completes the one or more operations associated with ErrorSpeaking state 1226, the electronic device may move to Complete step 1228 and return to Speaking state 1210 to continue to provide voice feedback for the speakable elements in the queue generated by the speech scheduler.

Alternatively, if the electronic device fails to perform all of the operations associated with ErrorSpeaking state 1226, the electronic device may move to Resume step 1230 and return to Speaking state 1210. The electronic device may fail to perform the operations associated with Speaking state 1210 for any suitable reason, including for example a failure to receive a valid "Complete" message, receiving a user instruction to cancel the ErrorSpeaking operations or to return to Speaking state 1210, an error timeout (e.g., 100 ms), or any other suitable reason or based on any other suitable condition.

The electronic device may acquire audio files associated with each of the speakable elements using any suitable approach. In some embodiments, the audio files may be locally stored by the electronic device, for example as part of firmware or software of the device. An inherent limitation of this approach, however, is that firmware is generally provided globally to all electronic devices sold or used in different locations where languages and accents may vary. To ensure voice feedback is provided in the proper language or with the proper accent, the firmware used by each device may need to be personalized. This may come at a significant cost, as several versions of firmware may need to be stored and provided, and be significantly more complex, as the firmware or software provider may need to manage the distribution of different firmware or software to different devices. In addition, the size of audio files (e.g., as opposed to text files) may be large and prohibitive to provide as firmware or software updates.

In some embodiments, the electronic device may generate audio files locally using a text to speech (TTS) engine operating on the device. Using such an approach, each electronic device may provide text strings associated with different menu options in the language associated with the device to the TTS engine of the device to generate audio files for voice feedback. This approach may allow for easier firmware or software updates, as changes to displays in which speakable elements are present may be reflected by a change in text strings on which the TTS engine may operate. The TTS engine available from the electronic device, however, may limit this approach. In particular, if the electronic device has limited resources, such as limited memory, processing capabilities, or power supply (e.g., limitations associated with a portable electronic device), the quality of the speech generated by the TTS engine may be reduced. For example, intonations associated with dialects or accents may not be available, or speech associated with particular languages (e.g., languages too different from a default language) may not be supported.

Figure 13:
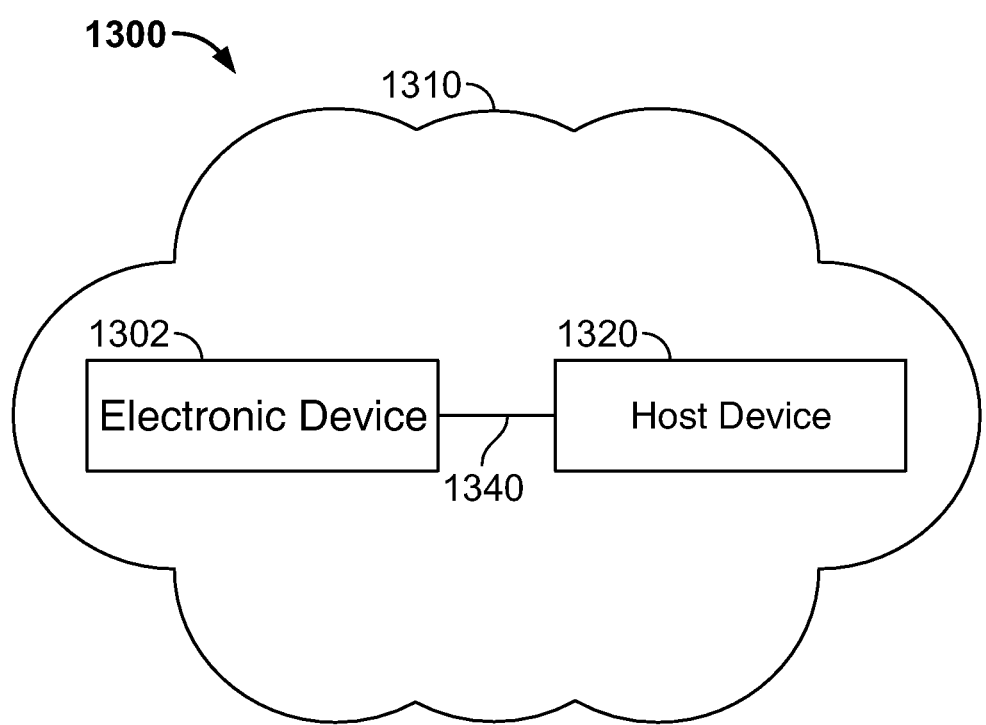
FIG. 13 is a schematic view of an illustrative communications system including an electronic device and a host device in accordance with one embodiment of the invention.

In some embodiments, the electronic device may instead or in addition receive audio files associated with speakable elements from a host device to which the electronic device is connected. FIG. 13 is a schematic view of an illustrative communications system including an electronic device and a host device in accordance with one embodiment of the invention. Communications system 1300 may include electronic device 1302 and communications network 1310, which electronic device 1302 may use to perform wired or wireless communications with other devices within communications network 1310. For example, electronic device 1302 may perform communications operations with host device 1320 over communications network 1310. Although communications system 1300 may include several electronic devices 1302 and host devices 1320, only one of each is shown in FIG. 13 to avoid overcomplicating the drawing.

Any suitable circuitry, device, system or combination of these (e.g., a wireless communications infrastructure including communications towers and telecommunications servers) operative to create a communications network may be used to create communications network 1310. Communications network 1310 may be capable of providing wireless communications using any suitable short-range or long-range communications protocol. In some embodiments, communications network 1310 may support, for example, Wi-Fi (e.g., a 802.11 protocol), Bluetooth (registered trademark), radio frequency systems (e.g., 1300 MHz, 2.4 GHz, and 5.6 GHz communication systems), infrared, protocols used by wireless and cellular phones and personal email devices, or any other protocol supporting wireless communications between electronic device 1302 and host device 1320. Communications network 1310 may instead or in addition be capable of providing wired communications between electronic device 1302 and host device 1320, for example using any suitable port on one or both of the devices (e.g., 30-pin, USB, FireWire, Serial, or Ethernet).

Electronic device 1302 may include any suitable device for receiving media or data. For example, electronic device 1302 may include one or more features of electronic device 100 (FIG. 1). Electronic device 1302 may be coupled with host device 1320 over communications link 1340 using any suitable approach. For example, electronic device 1302 may use any suitable wireless communications protocol to connect to host device 1320 over communications link 1340. As another example, communications link 1340 may be a wired link that is coupled to both electronic device 1302 and media provider 1320 (e.g., an Ethernet cable). As still another example, communications link 1340 may include a combination of wired and wireless links (e.g., an accessory device for wirelessly communicating with host device 1320 may be coupled to electronic device 1302). In some embodiments, any suitable connector, dongle or docking station may be used to couple electronic device 1302 and host device 1320 as part of communications link 1340.

Host device 1320 may include any suitable type of device operative to provide audio files to electronic device 1302. For example, host device 1320 may include a computer (e.g., a desktop or laptop computer), a server (e.g., a server available over the Internet or using a dedicated communications link), a kiosk, or any other suitable device. Host device 1320 may provide audio files for speakable elements of the electronic device using any suitable approach. For example, host device 1320 may include a TTS engine that has access to more resources than one available locally on electronic device 1302. Using a more expansive host device TTS engine, host device 1320 may generate audio files associated with text strings for speakable elements of the electronic device. The host device TTS engine may allow the electronic device to provide voice feedback in different languages or with personalized accents or voice patterns (e.g. using a celebrity voice or an accent from a particular region). The TTS engine may include a general speech dictionary and pronunciation rules for different sounds to generate audio for the provided text and convert the generated audio to a suitable format for playback by the electronic device (e.g., AIFF files). In some embodiments, the TTS engine may include a pre-processor for performing music specific processing (e.g., substituting the string "feat." or "ft." with "featuring"). Illustrative TTS implementations and host devices operative to provide audio to an electronic device are described in commonly assigned U.S. patent application Ser. No. 12/240,397, filed Sep. 29, 2008, entitled SYSTEMS AND METHODS FOR SPEECH PREPROCESSING IN TEXT TO SPEECH SYNTHESIS, which is incorporated by reference herein in its entirety. In some embodiments, host device 1320 may limit the amount of media transferred to the electronic device to account for the storage space needed to store the audio files associated with providing voice feedback (e.g., calculate the space expected to be needed for the voice feedback audio files based on the expected number of media files stored on the electronic device).

The host device may identify the text strings for which to provide audio files using any suitable approach. In some embodiments, the host device may identify text strings associated with data transferred from the host device to the electronic device, and provide the identified text strings to a TTS engine to generate corresponding audio files. This approach may be used, for example, for text strings associated with metadata for media files (e.g., title, artist, album, genre, or any other metadata) transferred from the host device to the electronic device (e.g., music or video). In some embodiments, the electronic device may identify the particular metadata for which to provide audio feedback to the host device (e.g., the electronic device identifies the title, artist and album metadata). The host device may use any suitable approach for naming and storing audio files in the electronic device. For example, the audio file name and stored location (e.g., directory number) may be the result of applying a hash to the spoken text string.

[For speakable elements that are not transferred from the host device to the electronic device (e.g., text of menu options of the electronic device firmware), however, the host device may not be aware of the text strings for which the TTS engine is to provide audio files. In some embodiments, the electronic device may provide a text file (e.g., an XML file) that includes strings associated with each of the static speakable elements for which voice feedback is provided to the host device. The electronic device may generate the text file with the speakable element strings at any suitable time. In some embodiments, the file may be generated each time the electronic device boots based on data extracted from the firmware or software source code during compiling. For example, when the electronic device compiles the source code associated with the models and views for display, the electronic device may identify the elements having a speakable property (e.g., the speakable elements) and extract the text string to speak and the priority associated with the speakable element. In some embodiments, the electronic device may generate the text file in response to detecting a change in the voice feedback language, voice feedback voice, or build change.

The extracted text may be provided to the host device in a data file (e.g., an XML file) generated when the electronic device boots. This approach may allow for easier changing of speakable elements with firmware or software updates, as the compiled firmware or software code may include the extracted speakable element information needed by the host device to generate audio files for voice feedback. In response to receiving the text file, the host device may generate, using the TTS engine, audio files for each of the speakable elements. In some embodiments, the text file may include an indication of a language change to direct the host device to generate new audio files for the changed text or using the changed voice or language. Systems and methods for generating audio files based on a received text file are described in more detail in commonly assigned U.S. Publication No. 2006/0095848, entitled AUDIO USER INTERFACE FOR COMPUTING DEVICES, filed Nov. 4, 2004, which is incorporated by reference herein in its entirety.

The following flowcharts describe illustrative processes for providing audio files used for voice feedback to an electronic device. FIG. 14 is a flowchart of an illustrative process for providing static strings to an electronic device. Process 1400 may begin at step 1402. At step 1404, the electronic device may generate a data file listing static strings. For example, the electronic device may extract, from firmware, strings of text displayed by the electronic device for which voice feedback may be provided. At step 1406, the electronic device may provide the file to a host device. For example, the electronic device may provide the file to the host device using a wired or wireless communications path. At step 1408, the host device may convert the static strings of the provided data file to audio files. For example, the host device may use a TTS engine to generate audio for each of the static strings (e.g., generate audio, compress the audio, an convert the audio to a file format that may be played back by the electronic device). At step 1410, the host device may transfer the generated audio to the electronic device. For example, the host device may transfer the generated audio files to the electronic device over a communications path. Process 1400 may then end at step 1412. The host device may store the audio files at any suitable location on the electronic device, including for example at a location or directory number resulting from a hash of the text string to speak.

FIG. 15 is a flowchart of an illustrative process for providing dynamic strings to an electronic device. Process 1500 may begin at step 1502. At step 1504, the host device may identify media to transfer to the electronic device. For example, the host device may retrieve a list of media to transfer (e.g., media within playlists) to transfer to the electronic device. At step 1506, the host device may identified metadata strings associated with the identified media. For example, the host device may retrieve specific metadata strings identified by a host device (e.g., artist, title and album strings) for each identified media item to be transferred to the electronic device.

At step 1508, the host device may convert the identified metadata strings (e.g., dynamic strings) to audio files. For example, the host device may use a TTS engine to generate audio for each of the dynamic strings (e.g., generate audio, compress the audio, an convert the audio to a file format that may be played back by the electronic device). At step 1510, the host device may transfer the generated audio to the electronic device. For example, the host device may transfer the generated audio files to the electronic device over a communications path. Process 1500 may then end at step 1512. The host device may store the audio files at any suitable location on the electronic device, including for example at a location or directory number resulting from a hash of the text string to speak.

The above-described embodiments of the present invention are presented for purposes of illustration and not of limitation, and the present invention is limited only by the claims which follow.

What is claimed is:

1. A method for providing voice feedback to a user of an electronic device, comprising:
   determining that content displayed on the electronic device has changed;
   in response to a determination that content displayed on the electronic device has changed, identifying at least two speakable items to be provided to a user, the at least two speakable items including a first speakable item associated with a first speakable order, and at least one second speakable item associated with a second speakable order;
   generating an initial queue including the identified first speakable item and the at least one second speakable item;
   ordering the first speakable item and the at least one second speakable item in the initial queue based on the respective speakable order associated with the first speakable item and the at least one second speakable item; and
   providing voice output corresponding to the first speakable item and the at least one second speakable item in the order specified in the initial queue.

2. The method of claim 1, further comprising:
   determining whether content displayed on the electronic device has changed a second time;
   in accordance with a second determination that the content displayed on the electronic device has changed:
   identifying at least two further speakable items to be provided to the user, the at least two further speakable items including a third speakable item associated with a third speakable order, and at least one fourth speakable item associated with a fourth speakable order;
   updating at least a portion of the initial queue to generate a revised queue including at least the third speakable item and the at least one fourth speakable item; and
   ordering at least the third speakable item and the at least one fourth speakable item in the revised queue based on the respective speakable order associated with the third speakable item and the at least one fourth speakable item.

3. The method of claim 2, further comprising, when the content displayed on the electronic device has changed the second time during the providing of the voice output corresponding to the first speakable item and the at least one speakable item:
   detecting the speakable item for which voice output was provided during changing of the content displayed on the electronic device;
   determining that the detected speakable item has the same speakable order in the initial queue and in the revised queue; and
   providing voice output from the revised queue starting with the detected speakable item.

4. The method of claim 2, further comprising, when the content displayed on the electronic device has changed the second time during the providing of the voice output corresponding to the first speakable item and the at least one speakable item:
   detecting the speakable item for which voice output was provided during changing of the content displayed on the electronic device;
   comparing the initial queue and the revised queue to identify common portions of the queues;
   determining that the speakable item for which voice output was provided during changing of the content displayed on the electronic device is not in a portion of the revised queue that is in common with the initial queue; and
   stopping providing voice output for the speakable item for which voice output was provided during changing of the content displayed on the electronic device.

5. The method of claim 4, further comprising:
   identifying a speakable item of the revised queue that follows the common portions of the queues; and
   providing voice output from the revised queue starting with the identified speakable item of the revised queue that follows the common portions of the queues.

6. The method of claim 1, wherein items associated with the first speakable order precede items associated with the second speakable order in the initial queue.

7. The method of claim 1, wherein providing the voice output comprises providing the voice output for the first speakable item and the at least one second speakable item sequentially and without human intervention.

8. The method of claim 1, wherein the at least two speakable items are displayed on a display of the electronic device.

9. An electronic device operative to provide voice feedback to a user, comprising a processor, a display, and an audio output, the processor operative to:
   determine that the content displayed on the electronic device has changed;
   in response to a determination that the content displayed on the electronic device has changed, identify at least two speakable items to be provided to a user, the at least two speakable items including a first speakable item associated with a first speakable order, and at least one second speakable item associated with a second speakable order;
   generate an initial queue including the identified first speakable item and the at least one second speakable item;
   order the first speakable item and the at least one second speakable item in the initial queue based on the respective speakable order associated with the first speakable item and the at least one second speakable item; and
   provide voice output corresponding to the first speakable item and the at least one second speakable item in the order specified in the initial queue.

10. The electronic device of claim 9, the processor further operative to:
    determine whether content displayed on the electronic device has changed a second time;
    in accordance with a second determination that the content displayed on the electronic device has changed:

identify at least two further speakable items to be provided to the user, the at least two further speakable items including a third speakable item associated with a third speakable order, and at least one fourth speakable item associated with a fourth speakable order;

update at least a portion of the initial queue to generate a revised queue including at least the third speakable item and the at least one fourth speakable item; and order at least the third speakable item and the at least one fourth speakable item in the revised queue based on the respective speakable order associated with the third speakable item and the at least one fourth speakable item.

11. The electronic device of claim 10, the processor further operative to, when the content displayed on the electronic device has changed the second time during the providing of the voice output corresponding to the first speakable item and the at least one speakable item:

detect the speakable item for which voice output was provided during changing of the content displayed on the electronic device;

determine that the detected speakable item has the same speakable order in the initial queue and in the revised queue; and provide voice output from the revised queue starting with the detected speakable item.

12. The electronic device of claim 10, the processor further operative to, when the content displayed on the electronic device has changed the second time during the providing of the voice output corresponding to the first speakable item and the at least one speakable item:

detect the speakable item for which voice output was provided during changing of the content displayed on the electronic device;

compare the initial queue and the revised queue to identify common portions of the queues;

determine that the speakable item for which voice output was provided during changing of the content displayed on the electronic device is not in a portion of the revised queue that is in common with the initial queue; and stop providing voice output for the speakable item for which voice output was provided during changing of the content displayed on the electronic device.

13. The electronic device of claim 12, the processor further operative to:

identify a speakable item of the revised queue that follows the common portions of the queues; and provide voice output from the revised queue starting with the identified speakable item of the revised queue that follows the common portions of the queues.

14. The electronic device of claim 9, wherein items associated with the first speakable order precede items associated with the second speakable order in the initial queue.

15. The electronic device of claim 9, wherein the processor operative to provide the voice output is further operative to provide the voice output for the first speakable item and the at least one second speakable item sequentially and without human intervention.

16. The electronic device of claim 9, wherein the at least two speakable items are displayed on a display of the electronic device.

17. A non-transitory computer readable storage media for providing voice feedback to a user of an electronic device, the computer readable media comprising computer program logic recorded thereon for:

determining that the content displayed on the electronic device has changed;

in response to a determination that the content displayed on the electronic device has changed, identifying at least two speakable items to be provided to a user, the at least two speakable items including a first speakable item associated with a first speakable order, and at least one second speakable item associated with a second speakable order;

generating an initial queue including the identified first speakable item and the at least one second speakable item;

ordering the first speakable item and the at least one second speakable item in the initial queue based on the respective speakable order associated with the first speakable item and the at least one second speakable item; and providing voice output corresponding to the first speakable item and the at least one second speakable item in the order specified in the initial queue.

18. The non-transitory computer readable storage media of claim 17, further comprising computer program logic for:

determining whether content displayed on the electronic device has changed a second time;

in accordance with a second determination that the content displayed on the electronic device has changed:

identifying at least two further speakable items to be provided to the user, the at least two further speakable items including a third speakable item associated with a third speakable order, and at least one fourth speakable item associated with a fourth speakable order;

updating at least a portion of the initial queue to generate a revised queue including at least the third speakable item and the at least one fourth speakable item; and ordering at least the third speakable item and the at least one fourth speakable item in the revised queue based on the respective speakable order associated with the third speakable item and the at least one fourth speakable item.

19. The non-transitory computer readable storage media of claim 18, further comprising computer program logic for, when the content displayed on the electronic device has changed the second time during the providing of the voice output corresponding to the first speakable item and the at least one speakable item:

detecting the speakable item for which voice output was provided during changing of the content displayed on the electronic device;

determining that the detected speakable item has the same speakable order in the initial queue and in the revised queue; and providing voice output from the revised queue starting with the detected speakable item.

20. The non-transitory computer readable storage media of claim 18, further comprising computer program logic for, when the content displayed on the electronic device has changed the second time during the providing of the voice output corresponding to the first speakable item and the at least one speakable item:

detecting the speakable item for which voice output was provided during changing of the content displayed on the electronic device;

comparing the initial queue and the revised queue to identify common portions of the queues;

determining that the speakable item for which voice output was provided during changing of the content displayed on the electronic device is not in a portion of the revised queue that is in common with the initial queue; and stopping providing voice output for the speakable item for which voice output was provided during changing of the content displayed on the electronic device.

21. The non-transitory computer readable storage media of claim 20, further comprising computer program logic for:
identifying a speakable item of the revised queue that follows the common portions of the queues; and
providing voice output from the revised queue starting with the identified speakable item of the revised queue that follows the common portions of the queues.

22. The non-transitory computer readable storage media of claim 17, the computer program logic for providing the voice output further comprises computer program logic for providing the voice output for the first speakable item and the at least one second speakable item sequentially and without human intervention.

23. The non-transitory computer readable storage media of claim 17, wherein the at least two speakable items are displayed on a display of the electronic device.

* * * * *